United States Patent
Alpert et al.

(10) Patent No.: US 10,257,295 B1
(45) Date of Patent: Apr. 9, 2019

(54) INTERNET ACTIVITY, INTERNET CONNECTIVITY AND NEARBY WI-FI AND LOCAL NETWORK DEVICE PRESENCE MONITORING SENSOR

(71) Applicant: Alarm.com Incorporated, Tysons, VA (US)

(72) Inventors: Charles Richard Alpert, Snoqualmie, WA (US); Roy Franklin Perry, Niwot, CO (US); Stephen Scott Trundle, Falls Church, VA (US); Alison Jane Slavin, Vienna, VA (US)

(73) Assignee: Alarm.com Incorporated, Tysons, VA (US)

( * ) Notice: Subject to any disclaimer, the term of this patent is extended or adjusted under 35 U.S.C. 154(b) by 133 days.

(21) Appl. No.: 15/220,622

(22) Filed: Jul. 27, 2016

Related U.S. Application Data

(60) Provisional application No. 62/198,228, filed on Jul. 29, 2015.

(51) Int. Cl.
*H04L 29/08* (2006.01)
*H04L 29/12* (2006.01)

(52) U.S. Cl.
CPC .......... *H04L 67/22* (2013.01); *H04L 61/2076* (2013.01); *H04L 67/24* (2013.01)

(58) Field of Classification Search
None
See application file for complete search history.

(56) References Cited

U.S. PATENT DOCUMENTS

| | | | | |
|---|---|---|---|---|
| 6,970,183 B1* | 11/2005 | Monroe | ................ | G08B 7/062 348/143 |
| 7,370,356 B1* | 5/2008 | Guo | ................... | G06Q 20/0855 370/254 |
| 10,021,530 B2* | 7/2018 | Sigal | ..................... | H04W 4/043 |
| 2003/0051026 A1* | 3/2003 | Carter | ..................... | H04L 41/00 709/224 |
| 2004/0028017 A1* | 2/2004 | Whitehill | ............. | H04L 63/0492 370/338 |
| 2007/0180521 A1* | 8/2007 | Malkin | .................. | G06F 21/55 726/22 |
| 2007/0206741 A1* | 9/2007 | Tiliks | ................. | H04M 3/2281 379/106.02 |
| 2008/0120688 A1* | 5/2008 | Qiu | ....................... | G06F 21/552 726/1 |
| 2010/0091682 A1* | 4/2010 | Armanino | ........... | H04L 63/1425 370/252 |

(Continued)

*Primary Examiner* — Thomas J Dailey
(74) *Attorney, Agent, or Firm* — Fish & Richardson P.C.

(57) ABSTRACT

In some implementations, a system can monitor Internet activity, internet connectivity, and nearby Wi-Fi and local network presence associated with a local network. Internet activity data of a network of a property over a particular period of time is initially obtained. Occupancy data from one or more devices associated with the property is then obtained. The occupancy data indicates a physical presence of people within the property over the particular period of time. An abnormality associated with the network of the property is then identified based on the obtained Internet activity data and the obtained occupancy data. An indication of the abnormality associated with the network of the property is then provided in response to identifying the abnormality associated with the network.

16 Claims, 11 Drawing Sheets

(56) References Cited

U.S. PATENT DOCUMENTS

| | | | | |
|---|---|---|---|---|
| 2011/0173260 A1* | 7/2011 | Biehl | ............... | G06Q 10/06 |
| | | | | 709/204 |
| 2013/0219463 A1* | 8/2013 | Sambamurthy | ....... | G06F 21/554 |
| | | | | 726/1 |
| 2015/0323915 A1* | 11/2015 | Warren | ............ | G05B 15/02 |
| | | | | 700/275 |

* cited by examiner

INTERNET ACTIVITY, INTERNET CONNECTIVITY AND NEARBY WI-FI AND LOCAL NETWORK DEVICE PRESENCE MONITORING SENSOR

CROSS-REFERENCE TO RELATED APPLICATION

This application claims priority from U.S. Provisional Application No. 62/198,228, filed Jul. 29, 2015, and titled "INTERNET ACTIVITY, INTERNET CONNECTIVITY AND NEARBY WI-FI LOCAL NETWORK DEVICE PRESENCE MONITORING SENSOR," which is hereby incorporated by reference in its entirety.

TECHNICAL FIELD

This disclosure relates to monitoring technology and, for example, Internet activity, internet connectivity and nearby Wi-Fi and local network device presence monitoring.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for monitoring technology. For example, techniques are described for Internet activity, internet connectivity, and nearby Wi-Fi and local network device presence monitoring. Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DETAILED DESCRIPTION

Figure 1:
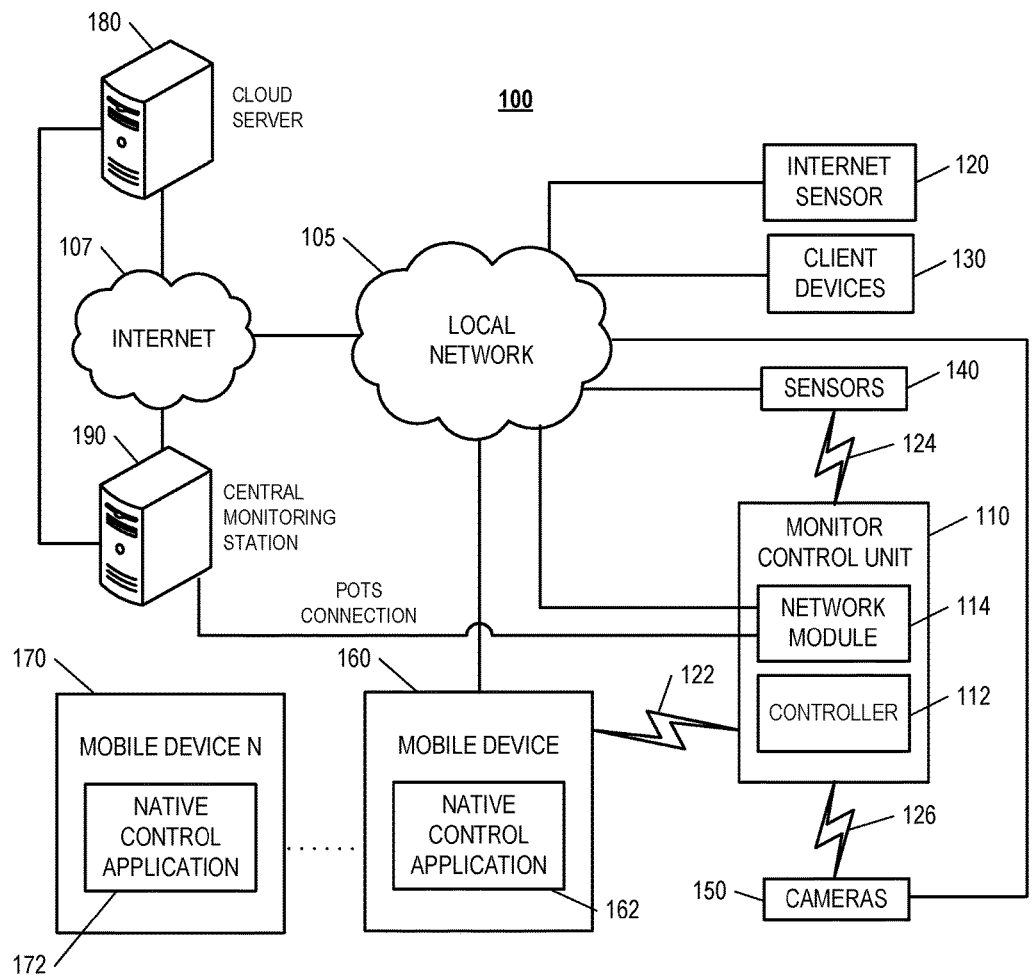
FIG. 1 illustrates an example of a system.

Techniques are described for Internet activity monitoring. For example, a system may detect Internet activity from a client device that indicates that the client device may be infected with malware, and in response, provide an alert to a user. The system may monitor Internet activity over a local subnetwork using an Internet activity monitoring sensor, also referred to as an internet sensor, configured to observe wide area network (WAN) traffic over the subnetwork and track Internet activity of client devices connected to the subnetwork based on either actively intercepting WAN-destined communication or by observing the traffic should the internet monitoring sensor be specifically defined as the client's default gateway. In some implementations, the internet sensor may intercept traffic by spoofing the MAC or IP address of the default gateway of the subnet. For example, the Internet activity monitoring sensor may discover client devices connected to the subnet and transmit ARP packets in an IPv4 environment and/or Neighbor Advertisement (NA) packets in an IPv6 environment to the user-defined/discovered client devices that associate the MAC address of the Internet activity monitoring sensor with the Internet Protocol (IPv4/IPv6) address of the default gateway of the subnetwork. Subsequently, all traffic directed outside the subnetwork (e.g., the Internet) may be sent through the Internet activity monitoring sensor and then forwarded through the default gateway of the subnetwork.

In some implementations, the internet sensor may intercept traffic through DHCP packet spoofing by substituting the IP address of the default gateway with the IP address of the internet sensor. For example, the internet sensor may initially monitor the activity on the subnetwork for DHCP requests over the subnetwork and respond to the DHCP request before the DHCP server.

In some implementations, the internet sensor may observe WAN traffic by operating as a standalone DHCP server. The DHCP server on the router would be manually disabled and client devices on the subnet would receive their DHCP lease information directly from the internet sensor, informing them that their default gateway will be the internet sensor. For example, an installer of the internet sensor may initially document the DHCP attributes of the router, such as, for example, the current DHCP IP address pool, the subnet mask, Domain Name Server (DNS) servers, and the static local area network (LAN) IP of the router (e.g., 192.168.0.1). The installer may disable the DHCP server on the router and configure the internet sensor with a static IP address and create a DHCP pool based on the DHCP attributes that were defined on the router. In response, client devices may obtain DHCP information from the internet sensor and all bi-directional traffic flow may pass through the internet sensor.

In some implementations, the internet sensor may intercept traffic by operating as a Wi-Fi access point with switch ports by having the user disable the service set identifier (SSID) of the router/access point and associate the client devices on the subnet with the SSID of the internet sensor. Any wired client devices could be connected to the switch ports of the internet sensor.

FIG. 1 illustrates an example of a system 100 that may be configured to use an internet sensor to monitor Internet activity over a network. The system 100 may include a local network 105, internet 107, a monitor control unit 110, an internet sensor 120, client devices 130, sensors 140, cameras 150, one or more mobile devices 160, 170, a cloud server 180, and a central monitoring station 190.

The local network 105 may be configured to enable electronic communications between devices connected to the local network 105. For example, the local network 105 may be configured to enable exchange of electronic communications between the internet 107, monitor control unit 110, the internet sensor 120, the client devices 130, the sensors 140, the cameras 150, and the one or more mobile devices 160, 170. The local network 105 may include, for example, Local Area Networks (LANs), for example, Wi-Fi, analog or digital wired and wireless telephone networks, for example, a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. The local network 105 may include multiple networks or subnetworks, each of which may include, for example, a wired or wireless data pathway. The local network 105 may also include a circuit-switched network, a packet-switched data network, or any other network able to carry electronic communications (e.g., data or voice communications). For example, the local network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The local network 105 may include one or more networks that include wireless data channels and wireless voice channels. The local network 105 may also be a wireless network, a broadband network, or a combination of networks including a wireless network and a broadband network.

The monitor control unit 110 may include a controller 112 and a network module 114. The controller 112 may be configured to control a system, for example, security system associated with a property that includes the monitor control unit 110. In some examples, the controller 112 may include a processor or other control circuitry configured to execute instructions of a program that controls operation of a security system. In these examples, the controller 112 may be configured to receive input from sensors, detectors, or other devices associated with the security system and control operation of components of the security system, e.g., a camera, a motion sensor, an alarm detector, or other devices associated with the property, e.g., an appliance, lights, etc. For example, the controller 112 may be configured to control operation of the network module 114 included in the monitor control unit 110.

The network module 114 may be a communication device configured to exchange communications over the local network 105. The network module 114 may be a wireless communication module configured to exchange wireless communications over the local network 105. For example, the network module 114 may be a wireless communication device configured to exchange communications over a wireless data channel. In this example, the network module 114 may transmit user location data within or external to the property, environmental data from the property, e.g., indoors at the property or outdoors at the property, or other data over a wireless data channel. The wireless communication device may include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, IP, or Wi-Fi.

The network module 114 also may be a wired communication module configured to exchange communications over the local network 105 using a wired connection. For instance, the network module 114 may be a modem, a network interface card, or another type of network interface device. The network module 114 may be an Ethernet network card configured to enable the monitor control unit 110 to communicate over a local area network and/or the Internet. The network module 114 also may be a voiceband modem configured to enable the alarm panel to communicate over the telephone lines of Plain Old Telephone Systems (POTS). In some implementations, the alarm panel may be a broadband or cellular gateway where the network module 114 may enable the monitor control unit 110 to communicate over the local network 105.

The system 100 may include the monitor control unit 110, which may communicate with the internet sensor 120, the sensors 140, or the cameras 150 to monitor various operations related to functions of the client devices 130. The monitor control unit 110 may monitor the operation of the internet sensor 120, the sensors 140, and the cameras 150 based on exchanging communications with the internet sensor 120, the sensors 140, and the cameras 150. For example, the monitor control unit 110 may receive an Internet activity report from the internet sensor 120. In response to receiving the Internet activity report, the monitor control unit 110 may monitor the operations of the sensors 140, or the cameras 150. For example, the internet sensor 120 may transmit an Internet activity report indicating unusual internet traffic activity on one or more of the client devices 130 and/or mobile devices 160, 170, and in response, the monitor control unit may check sensor data from the sensors 140 to determine whether a user may be present within the property at the time when the unusual activity is detected. Notifications and/or reports of activity data may be transmitted from the cloud server 180 to the client devices 130 or mobile devices 160, 170 using various communication mediums such as, for example, e-mail, SMS, text messages, or push notification, etc. For example, if the client devices 130 and/or mobile devices 160, 170 are configured with parental safety options, the internet sensor 120 may provide reports of unauthorized attempts to access a restricted webpage to the cloud server 180, and in response, the cloud server 180 may transmit the notification to the one or more mobile devices 160, 170 that there is an unauthorized attempt to access a restricted webpage.

The internet sensor 120 may be an electronic device configured to monitor Internet activity over the local network 105 by exchanging electronic communications with the monitor control unit 110, the client devices 130, and the one or more mobile devices 160, 170 over the local network 105. For example, the internet sensor 120 may monitor the Internet activity of the client devices 130 and/or mobile devices 160, 170 over the local network 105.

In some implementations, the local network 105 may include a router connected to a modem that receives an internet connection from an internet service provider (ISP). In these implementations, the router may be a residential gateway that provides a subnetwork for the internet sensor 120 and the client devices 130 and/or mobile devices 160, 170 connected to the local network 105. In other implementations, the local network 105 may include multiple routers that provide multiple subnetworks within the local network 105. In such implementations, the system 100 may include separate internet sensors 120 for each subnetwork within the local network 105. For example, if the system 100 includes a local network 105 with two subnetworks hosted by two routers, the system 100 may include two internet sensors 120 to monitor the traffic of each respective subnetwork.

In some implementations, the internet sensor 120 may transmit reports of the Internet activity of the client devices 130 and/or mobile devices 160, 170 to the cloud server 180. For example, the internet sensor 120 may regularly transmit Internet activity reports to the monitor control unit 110, which in response, may determine if there is any detected abnormal Internet activity. For instance, as discussed more specifically in FIG. 2, the activity reports may include inbound and outbound traffic activity over the local network 105, identification, browsing history, and downloads of the client devices 130 and/or mobile devices 160, 170 over the local network 105, or other information that may be relevant to internet traffic over the local network 105.

In some implementations, in response to receiving activity reports indicating unusual internet traffic over the local network 105 (e.g., websites accessed, time of activity, excessive bandwidth), the cloud server 180 may analyze the activity reports and compare the data generated by the sensors 140 to determine if there may be a potential Internet security breach. For example, if the activity report generated by the internet sensor 120 indicates excessive bandwidth usage during particular time periods, the monitor control unit 110 may cross-reference the time periods identified as having excessive bandwidth to occupancy data indicating whether users were present within the property during the identified time periods. In such examples, the cloud server 180 may determine, based on the sensor data indicating that users were not present within the property, that there may be a breach in the internet security, for example, malware processes executing on the client devices 130 and/or mobile devices on the property are using bandwidth. In another example, the cloud server 180 may determine the activity report from the internet sensor 120 indicates that little Internet activity is occurring when the property is not occupied so that there is no potential Internet security breach.

In other implementations, the activity reports may be used to determine occupancy of the property. For example, if the activity report indicates normal internet traffic activity for when a user is actively using a client device 130 and or mobile device 160, 170, the cloud server 180 may use that report in determining that the property is occupied. In another example, in response to a triggered alarm event within a property, the cloud server 180 may analyze the recent activity report transmitted by the internet sensor 120 to determine user activity within the property. For instance, if the activity report indicates normal internet traffic activity, the monitor cloud server 180 may determine that there is no security breach within the property and that the triggered alarm event may have been a false alarm.

In some instances where there may be more than one internet sensor 120 connected to the local network 105, the separate internet sensors 120 may collectively transmit Internet activity reports to the cloud server 180 which may aggregate the separate Internet activity reports into a single report. In other instances, the cloud server 180 may transmit separate reports to the one or more mobile devices 160, 170. In some other implementations, the internet sensor 120 may provide data describing observed traffic to the control unit 110 and the control unit 110 may generate the Internet activity reports based on the data describing observed traffic.

Figure 2:
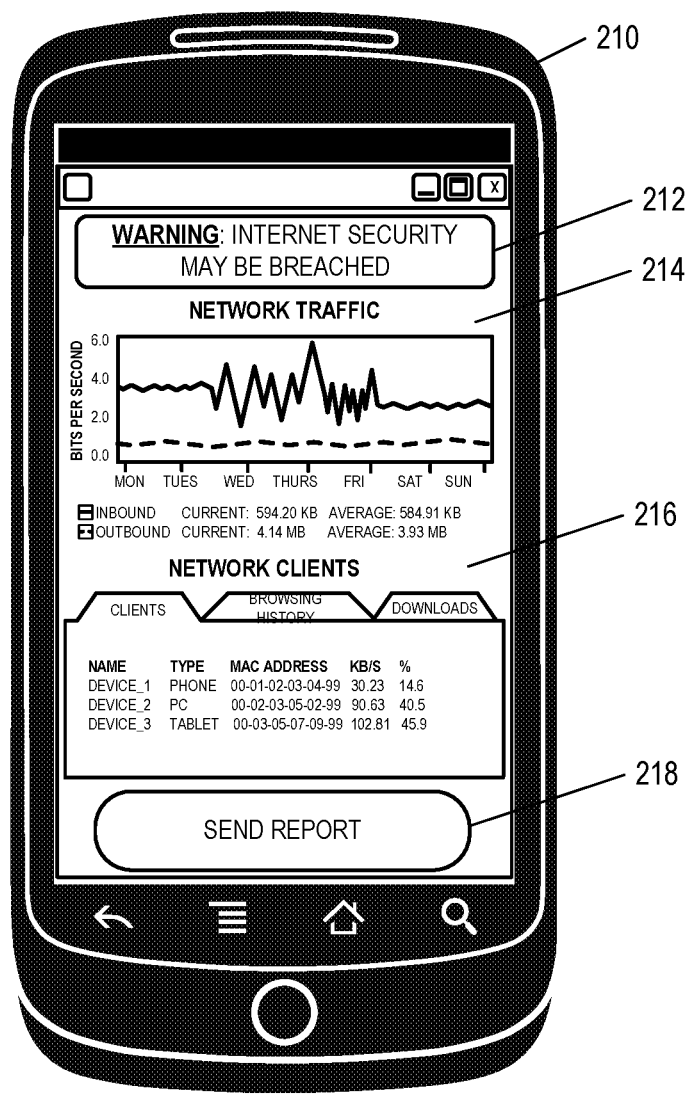
FIG. 2 illustrates an example of a user interface.

In some implementations, after determining that the Internet activity reports indicate a security breach, the cloud server 180 or monitor control unit 110 may send transmissions to the sensors 140, the cameras 150, to one or more mobile devices 160, 170. For example, as represented in FIG. 2, the cloud server 180 may transmit a summary of the Internet activity report to the one or more mobile devices 160, 170, indicating a summary of the internet traffic monitored by the internet sensor 120.

In some instances, the internet sensor 120 may be used to trigger the capture of an image or video clip in response to determining that an unknown MAC address or MAC address known to be suspicious is detected on the local network 105. For example, the internet sensor 120 may transmit a signal to the cloud server 180, the monitor control unit 110, or the cameras 150 to request a camera capture video footage of the property in response to determining that an unknown MAC address or a MAC address known to be suspicious is detected on the local network 105.

In some instances, the cloud server 180 may process activity data from the internet sensor 120 and identify that an unidentified or known suspicious MAC address is detected on the local network 105. For example, if an unknown MAC address is detected on the local network 105, the monitor control unit 110 may play a sound, (e.g., a chime) or send e-mail, SMS, text messages, or push notifications, etc. to notify the user of the security breach and log an event on the cloud server 180 or monitor control unit 110. In some instances, the cloud server 180 may also provide a user interface to allow a user to add the unknown MAC address to the list of approved client devices 130 or mobile devices 160, 170 to prevent future security breach alerts.

In some instances, the internet sensor 120 may be used to monitor internet connections when particular WAN destinations, defined via a user interface on the cloud server 180, are either contacted and/or contacted for extended periods of time. For example, the sensors 140 including image sensors or video cameras 150 may be used to capture an image or video clip of device being used by a user to access a WAN destination with age-restricted content. In another example, the sensors 140 may include an "Internet of things" device, such as a light, that may adjust lighting patterns in response to the particular WAN destination being contacted (e.g., strobe lighting, or changing light color). In some implementations, the sensors 140 may not capture additional information unless a WAN destination is accessed for an extended period of time on the one or more client devices 130 or mobile devices 160, 170.

In some instances, the internet sensor 120 and the connected monitor control unit 110 may be used to create various alarm signals for security breaches over the local network 105 (e.g., unknown MAC addresses detected on the LAN). For instance, when the internet sensor 120 detects a security breach over the local network 105, the monitor control unit 110 or, cloud server 180 may generate an alarm signal in response to detecting the security breach and transmit the alarm signal to the central monitoring station 190. In some instances, the central monitoring station 190 may have different routing mechanisms for different types of security breaches. For example, in response to receiving a high priority security breach such as potential identity theft, the security provider may inform the property owner or law enforcement authorities.

In some instances, the internet sensor 120 may transmit periodic updates to the monitor control unit 110 locally, or via the cloud server 180 indicating current Internet bandwidth usage. For example, the periodic updates may include quick glances into bandwidth usage (e.g., on an interface, mobile application, or a web interface, etc.) with notifications if usage is higher or lower than expected for particular periods of time (e.g., hourly, daily, weekly, etc.). In another example, the internet sensor 120 may be used to create a user-defined threshold for bandwidth for particular types of internet activities such as data subscriptions. In such an example, the internet sensor 120 may monitor the Internet bandwidth usage and provide an update to the monitor control unit 110 via the cloud server 180 when the threshold has been exceeded or not met.

The client devices 130 and/or mobile devices 160, 170 may be devices within the property that exchange network communications over the local network 105 such as smartphones, tablets, personal computers (PCs), network-enabled media players, home entertainment systems, cloud storage devices, and other types of network devices. For example, the client devices 130 may access a service made available by a server on the local network 105.

In some instances, the DHCP server may be on a router connected to the local network 105. In these instances, the client devices 130 and/or mobile devices 160, 170 may be assigned a DHCP IP address by the router where the DHCP server operates. In other instances, the local network 105 may include one or more DHCP servers using one or more routers to assign DHCP IP addresses to the client devices. In these instances, the client devices 130 and/or mobile devices 160, 170 may be connected to specified subnetworks within the local network 105 defined by the one or more routers connected to the local network 105.

The sensors 140 may include pressure sensors, temperature sensors, motion sensors, occupancy sensors, image sensors, or device sensors configured to the monitor control unit 110. For example, the sensors 140 may collect and transmit information about the property to the monitor control unit 110 and the monitor control unit network module 113 would transmit the data to the cloud server 180 or the central monitoring station 190, either of which may analyze or aggregate data to control monitoring operations of the system 100.

The cameras 150 may be surveillance cameras that provide security for the property where the system 100 may be located. For example, the cameras 150 may be closed-circuit television cameras (CCTV) that collect video or image footage of any events that may happen inside or outside the property. The cameras 150 may transmit video or audio signals of the captured footage to the monitor control unit 110, the cloud server 180, and/or the central monitoring station 190.

The one or more mobile devices 160, 170 may be devices that host one or more native applications, e.g., the native applications 162, 172. A native application for a mobile device may refer to an application that is developed for use on the mobile device and is installed on the mobile device, e.g., through an application store or included in an operating system of the mobile device. The one or more mobile devices 160, 170 may be cellular phones or non-cellular locally networked devices. The one or more mobile devices 160, 170 may include a cell phone, a smart phone, a tablet PC, a personal digital assistant ("PDA"), or any other portable device configured to communicate over a network. For example, implementations also may include Blackberry-type devices, e.g., as provided by Research in Motion, electronic organizers, iPhone-type devices, e.g., as provided by Apple, iPod devices, e.g., as provided by Apple, or other portable music players, other communication devices, and handheld or portable electronic devices for gaming, communications, and/or data organization. The one or more mobile devices 160, 170 may be the same or may include mobile devices of different types. The one or more mobile devices 160, 170 may perform functions unrelated to the system 100, such as placing personal telephone calls, playing music, playing video, displaying pictures, browsing the Internet, maintaining an electronic calendar, etc.

In some implementations, the one or more mobile devices 160, 170 may communicate with and receive system 100 data from the monitor control unit 110 using the communication link 122. For instance, the one or more mobile devices 160, 170 may communicate with the monitor control unit 110 using various local wireless protocols, such as Wi-Fi, Bluetooth, Z-Wave, ZigBee, and Powerline Communication (PLC) technologies such as HomePlug (e.g., HPAV, HPAV2), and G.hn (Ethernet over powerline), or wired protocols such as Ethernet, USB, and other wired protocols based on the RS232, RS485, and/or RS422 standards. The one or more mobile devices 160, 170 may connect locally to the system 100 and its sensors and other devices. The local connection may improve the speed of communications because communicating through the local network 105 with a remote server, e.g., the cloud server 180, may be slower.

Although the one or more mobile devices 160, 170 are shown communicating with the monitor control unit 110, the one or more mobile devices 160, 170 may communicate directly with the internet sensor 120 and other devices controlled by the monitor control unit 110. In some implementations, the one or more mobile devices 160, 170 may replace the monitor control unit 110 and perform the functions of the monitor control unit 110 for local control and long range or offsite communication.

In other implementations, the one or more mobile devices 160, 170 may receive system 100 data captured by the monitor control unit 110 through the local network 105. The one or more mobile devices 160, 170 may receive the data from the monitor control unit 110 through the local network 105, or the cloud server 180 and may relay data received from the monitor control unit 110 to the one or more mobile devices 160, 170 through the local network 105. In this regard, the application server may facilitate communications between the one or more mobile devices 160, 170 and the monitor control unit 110.

Although the one or more mobile devices 160, 170 are shown in FIG. 1 as being connected to the local network 105, in some implementations, the one or more mobile devices 160, 170 are not connected to the local network 105. In these implementations, the one or more mobile devices 160, 170 may communicate directly with one or more of the system 100 components and no network connection, e.g., connection to the Internet, or reliance on remote servers is needed.

In some implementations, a mobile device 160, 170 may be able to determine a geographic location associated with the mobile device 160, 170, and may communicate information identifying a geographic location associated with the mobile device 160, 170. For example, a mobile device 160, 170 may determine the current geographic location of the mobile device 160, 170 by using global positioning system (GPS) capabilities. In other implementations, a geographic location associated with a mobiles device 160, 170 may be determined using other methods, for example, by using Wi-Fi access point triangulation data, cellular network triangulation data, or IP address information, when the mobile device 160, 170 has network connectivity. The mobile device 160, 170 may transmit data identifying the geographic location of the mobile device 160, 170 over the local network 105 to the monitor control unit 110.

The one or more mobile devices 160, 170 may each include a native application 162, 172, respectively. The native application 162, 172 refers to a software/firmware program running on the corresponding mobile devices that enables the features below. The one or more mobile devices 160, 170 may load or install the native application 162, 172 based on data received over a network or data received from local media. The native application 162, 172 may run on mobile devices' platforms, such as Apple iOS, iPhone, iPod touch, Blackberry, Google Android, Windows Mobile, etc.

The native application identifies a geographic location associated with the mobile device 160, 170 and communicates information identifying the geographic location. For example, a mobile device 160, 170 having the native application 162, 172 may determine a geographic location of the mobile device 160, 170 using GPS capabilities, and may communicate data identifying the geographic location to the application server. In some instances, the native application 162, 172 may check the location of the mobile device 160, 170 periodically and may automatically detect when a user associated with the mobile device 160, 170 is going toward or away from a property.

The cloud server 180 may be a remote monitoring station for a service provider such as an internet service provider, an alarm security provider, or an internet security provider that collects data transmissions over the Internet 107 such as, for example, client device 130 and/or mobile device 160, 170 Internet activity and nearby Wi-Fi and local network device presence at a customer's premises, and internet connectivity status of the local network 105 over cellular via the network module 114 of the monitor control unit 110. The cloud server 180 may track activity reports of the local network 105 transmitted from devices connected to the local network 105, over the Internet 107 or a cellular network. For example, in some instances, the cloud server 180 may be configured to exchange communications with a local device connected to the local network 105 that collects activity data and transmits the activity data to the cloud server 180 over the Internet 107. In some implementations, the cloud server 180 may be configured to transmit cloud-based configuration settings to the monitor control unit 110, internet sensor 120, sensors 140, or cameras 150 to adjust the operations of those devices on local network 105.

The central monitoring station 190 may be a server that is operated by a third party security provider and provides monitoring services in response to alarm events within properties that re serviced by the security provider. For instance, in response to a detected alarm event (e.g., a home invasion, a power outage, or a fire) within a property, the monitor control unit 110 may transmit an alarm signal to the central monitoring station 190 including information related to the alarm event and related property information. In response, the central monitoring station 190 may forward the alarm signal to the appropriate authorities (e.g., emergency responders) that are dispatched to the property.

The hardware of the internet sensor 120 may include various configurations. In one example, the internet sensor 120 may include a Wi-Fi access point (AP) interface with a Wi-Fi chipset and driver that allows for concurrent AP and RFMON operations. In another example, the internet sensor 120 may include a Wi-Fi AP interface and an additional Wi-Fi interface where one interface passively gathers Wi-Fi node information and the other interface functions as a Wi-Fi AP with a service set identifier (SSID) for the client devices 130 and/or mobile devices 160, 170 to associate with.

In some implementations, the internet sensor 120 may operate as a wireless access point with switch ports to monitor inbound and outbound internet traffic of the one or more client devices 130 or mobile devices 160, 170 connected to it. In this configuration no default gateway MAC spoofing mechanisms are required to intercept traffic. In some instances, the one or more client devices 130 or mobile devices 160, 170 may associate with the service set identifier (SSID) of the internet sensor 120. In other instances, the client devices 130 or mobile devices 160, 170 may be plugged into switch ports on the internet sensor 120.

In some implementations, the internet sensor 120 may be used to detect the presence of nearby Wi-Fi devices and communicate such information to the monitor control unit 110 and/or cloud server 180. For instance, the internet sensor 120 may include a wireless network interface controller (WNIC) configured to passively "sniff" Wi-Fi probe requests to register Wi-Fi activity of devices. In such an instance, the internet sensor 120 may be configured to have at least one WNIC in radio frequency monitor (RFMON) mode, which allows the WNIC of the internet sensor 120 to monitor Wi-Fi management traffic without having to associate with a Wi-Fi access point or an ad hoc network.

In implementations where the internet sensor 120 may include the WNIC, Wi-Fi devices in range of the internet sensor may initially transmit a probe request on all channels to search for nearby access points. The internet sensor 120 may detect these probe requests, which are part of the Wi-Fi management frame. In response to detecting the probe requests, the internet sensor 120 may identify data included in the probe requests such as the date or timestamp, the radio frequency (e.g., 2412 Megahertz), the received signal strength indication (RSSI) (e.g., −63 decibels), the basic service set identifier (BSSID), the destination address, the source address (e.g., the MAC address of the Wi-Fi device), service set identifier (SSID), or supported data rates (e.g., 1.0 Megabit, 2.0 Megabit, etc.). The internet sensor 120 may transmit a signal to the monitor control unit 110 and/or cloud server 180 to provide an alert and log an event for a potential security breach that includes the MAC address of the Wi-Fi device transmitting the probe request frame.

In some instances, the internet sensor 120 may be used to trigger the capture of an image or video clip in response to determining that an unknown MAC address or MAC address known to be suspicious is detected within Wi-Fi range but not connected to a network. For example, the internet sensor 120 may transmit a signal to the cloud server 180, monitor control unit 110, or cameras 150 to request a camera capture video footage of the property in response to detecting that an unknown MAC address or a MAC address known to be suspicious is in the vicinity and is not connected to the local network 105.

In some instances, the internet sensor 120 may be used during an alarm event triggered by the monitor control unit 110. For example, during an alarm event, the internet sensor 120 may be used to transmit the MAC address history for the duration of the alarm or a particular time period (e.g., one hour) to the cloud server 180. In such examples, the transmission may include roaming nodes (e.g., smart phones) that are not known to be connected to the local network 105. In some instances, known devices connected to the local network 105 via Wi-Fi may also be included in the transmission.

In some instances, the internet sensor 120 may be used to detect Wi-Fi devices that have repeatedly tried to unsuccessfully connect to an SSID. For example, in response to detecting the unsuccessful connection attempts using the Wi-Fi sniffing technique, the internet sensor 120 may transmit a signal to the monitor control unit 110 and/or cloud server 180 to provide an alert and log an event for a potential security breach attempt that includes the MAC address of the Wi-Fi device transmitting the connection request or other data included within the probe request frame.

In some implementations, the system 100 may additionally or alternatively include satellite passive Wi-Fi probe request sniffing devices located within a property that are configured to detect Wi-Fi probe requests and transmit the detected Wi-Fi probe requests to the internet sensor 120. For example, the satellite passive Wi-Fi passive probe requesting sniffing devices may transmit the information to the internet sensor 120 and/or to the monitor control unit 110 and/or cloud server 180, using various communication technologies such as, for example, radio frequency (RF), Wi-Fi, Wi-Fi direct, Bluetooth, Powerline communication (PLC) (e.g., HPAV, HPAV2), G.hn, Ethernet, etc.

In some instances, the internet sensor 120 may be used to determine the presence of client devices 130 and/or mobile devices 160, 170 on the local network 105. Known client devices 130 and/or mobile devices 160, 170 may be configured via a user interface on the cloud server 180 to report to the monitor control unit 110 and/or cloud server 180 that the client devices 130 and/or the mobile devices 160, 170 are no longer detected on the local network 105. For example, a process running on the internet sensor 120 may monitor local network 105 traffic of client devices 130 or mobile devices 160, 170 for periodic network management packets relating to, for example, ARP, ICMPv6, etc., and/or monitor for responses to proactive monitoring from the internet sensor 120 to the client devices 130 and/or mobile devices 160, 170 through methods such as, for example, ICMP ping, ARP, etc. Should there be zero packets observed during a defined threshold for a consecutive period of retries, such as zero packets observed after three 10 minute intervals (e.g., for a total of 30 minutes), an alert event may be communicated to the cloud server 180 which may then notify the central monitoring station 190 and/or customer via e-mail, SMS, text messages, or push notification, etc., stating that the device is no longer seen on the network. The interval and retry numbers may be configurable by the user via the cloud server 180. Alert events may be triggered by, for example, the client devices 130 and/or mobile devices 160, 170 leaving or being removed from the premises, switching to a different network, being powered off, or having the battery die, and if utilizing Wi-Fi, loss of connection due to interference, range issues within the premises, or Wi-Fi disabled intentionally, e.g., airplane mode.

In some implementations, the internet sensor 120 may be used to validate connectivity to the internet from the local network 105. For instance, the internet sensor 120 may run a process that checks multiple websites via outbound ports on the Internet, e.g., HTTP (TCP/80) or HTTPS (TCP/443), to initially determine if there is Internet connectivity from the local network 105. In response to determining that all of the destined websites are inaccessible, the internet sensor 120 transmits a signal indicating that there may be an Internet connectivity issue to the monitor control unit 110 using wireless technologies such as, for example, radio frequency (RF), Bluetooth, or Wi-Fi. In response to receiving the signal, the monitor control unit 110 may transmit information related to the Internet connectivity issue to a central monitoring station 190 and/or the cloud server 180 using a connection other than the local network 105 internet 107 connection such as, for example, cellular or POTS. In some instances, the internet sensor 120 may track a connectivity status that tracks whether the Internet connectivity issue is resolved and if so will transmit a signal indicating the resolved status to the monitor control unit 110. For example, when at least one of the multiple websites is reachable via the outbound ports, the internet sensor 120 may update the connectivity status to show as resolved. Once connection to at least one of the destined websites are reachable over a particular period (e.g., five minutes) and over a threshold percentage of successful connection attempts (e.g., 80%), the monitor control unit 110 may receive a signal from the internet sensor 120 indicating the connectivity status for the Internet connectivity issue is resolved. In some instances, the internet sensor and/or monitor control unit 110 may log the resolution and transmit the resolution to the cloud server 180 and/or the central monitoring station 190 and/or an internet service provider.

In some implementations, the internet sensor 120 may be configurable locally using a client device 130 and/or mobile device 160, 170 connected to the local network 105. For instance, the internet sensor 120 may exchange communications with a local installation client connected over the local network 105 that includes configuration settings for the internet sensor 120. In another instance, the internet sensor 120 may be configurable via a user interface located on the cloud server 180.

In some implementations through an interface located on the cloud server 180, one can manually define lists for known hosts, and known suspicious hosts. For example, the unknown host list may automatically be populated with MAC addresses that appear in Internet activity monitoring data collected by the internet sensor 120. The unknown hosts may be any device attempting to connect to the local network 105 that is not included in a user-defined list of known or known suspicious client devices 130 maintained by the user on the cloud server 180. The unknown hosts list may include the MAC addresses of the unknown host devices, vendor information associated with the MAC addresses of the unknown hosts, and last seen timestamps for each particular unknown host device indicating the last instance when each particular unknown host device was observed in the network activity. In some instances, hosts that appear on the unknown hosts list may also be added to the known host lists once a user provides an input indicating the unknown host is actually a known host.

The known hosts list may include all information included in the unknown hosts list and additionally, the device names associated with each known host device over the local network 105 (e.g., user-specified device names). The user-specified known suspicious hosts list may include known hosts that the user designates as suspicious based on the user not knowing what these particular client devices 130 and/or mobile devices 160, 170 are or are flagged to have additional monitoring/alerts associated with these particular client devices 130 and/or mobile devices 160, 170. For instance, the known suspicious hosts list may be used to more closely monitor the Internet activity of the user-specified suspicious known host client devices 130 and/or mobile devices 160, 170 compared to the other known host client devices 130 or mobile devices 160, 170. Another instance may indicate that a known suspicious client device 130 and/or mobile device 160, 170 has just come online and an alert could be sent to the user via e-mail, SMS, text messages, or push notification, etc. to let them know so that the user can try to locate the client device 130 and/or mobile devices 160, 170.

In some instances, the internet sensor 120 may be used to collect data to generate cloud-based reports on the cloud server 180 that include data such as, for example, Internet activity, domain categorization, and bi-directional bandwidth utilization. For instance, the cloud-based reports may include Internet activity data transmitted to the cloud server such as data that is presented to a user over an interface on the devices connected to the local network 105. In such instances, the data may be processed and presented in a way such that the user may easily understand the content in the form of visualizations such as graphs and charts. The data may include activity data for hosts connected to the local network 105 such as known or unknown client devices 130 and/or mobile devices 160, 170 that includes details such as date and timestamps for site visits, the destination Fully Qualified Domain Name (FQDN) for each site visited, and/or advanced details such as the source MAC address, source IP address or port, destination IP address and/or a FQDN and a port for each site visited. In other instances, the FQDNs may be categorized to help users understand the types of sites that client devices 130 and/or mobile devices may be visiting. In other instances, bi-directional bandwidth reports over particular time periods (e.g., hourly, daily, weekly, monthly, etc.) may be provided to provide information related to Internet activity over the local network 105. In one example, the bi-directional bandwidth reports may be available in a user interface on the monitor control unit 110.

In some implementations, the internet sensor 120 may be used to collect data to generate cloud-based reports on the cloud server 180 that include nearby Wi-Fi device presence information. For instance, the cloud-based reports generated by the data collected from the internet sensor 120 may include basic details such as a list of past and present MAC addresses along with the last time when such MAC addresses were detected being in the vicinity of the internet sensor 120 and/or satellite nearby Wi-Fi presence devices. In other instances, advance details such as date and timestamp, radio frequency, BSSID, destination address, source address (e.g., MAC address of the detected device), SSID, and supported data rates may be included in the cloud-based reports.

In some implementations, the internet sensor 120 may be used to collect data to generate cloud-based reports on the cloud server 180 that include internet connectivity issues history. For instance, the cloud-based reports may include a log of when a potential Internet connectivity issue was detected and the duration of the connectivity issue. In such instances, the cloud-based reports may include a map that includes graphics that represent the impact of the connectivity issue of different geographical levels (e.g., neighborhoods, cities, states, etc.). In other instances, the data included in the cloud-based reports may be graphed over a particular time period to generate insight into the frequency of Internet connectivity issues within a property.

FIG. 2 illustrates an example user interface for tracking Internet activity. For example, a user interface 200 may be presented on a mobile device 210 (e.g., as a webpage) or may be displayed by an application that operations on the mobile device 210 (e.g., displayed by a native internet traffic monitoring application). In general, the user interface 200 may include a notification 212, network traffic 214, network clients 216, and a button 218.

The notification 212 may be an alert sent to a user indicating activity related to the system 100. For example, as represented in FIG. 2, in some implementations, the notification 212 may display an alert to the user that the internet security within the system 100 has been breached in response to the internet sensor detecting abnormal activity over the local network 105 such as, for example, increased download/upload activity compared to routine internet traffic, unauthorized attempted access by unknown client devices over the local network 105, or detecting a client device 130 or mobile device 160, 170 that is infected with malware. In some implementations, the notification 212 may be an alert indicating an internet security breach detected by an alarm system configured to the monitor system control unit 110.

The network traffic 214 may display details related to Internet activity within the local network 105. For example, as represented in FIG. 2, the network traffic 214 may display network traffic trends and usage patterns such as download and upload activity of the one or more client devices 130 or mobile devices 160, 170. For instance, the network traffic 214 may display current traffic volumes, such as inbound and outbound network traffic, and or average traffic volumes over particular periods of time (e.g., daily, weekly, monthly, etc.).

The network clients 216 may display tabbed windows for showing different types of information related to the network clients connected over a local network. For example, as represented in FIG. 2, the network clients 216 may include tabbed windows for the one or more client devices 130 connected to the local network 105 (e.g., "clients" tab), browsing history of the client devices 130 and/or mobile devices 160, 170 (e.g., "browsing history" tab), or file downloads by the client devices 130 and/or mobile devices 160, 170 (e.g., "downloads" tab). The "clients" tab may show information about the one or more client devices 130 and/or mobile devices 160, 170 such as, for example, device name, device type, MAC address, average connection speed, or bandwidth usage. For instance, the "clients" tab may list the various client devices 130 and/or mobile devices 160, 170 that may be connected to the local network 105 within a particular period of time (e.g., one day). The "browsing history" tab may show recent web search and browsing activity, and associated data such as page titles, time of visit, or duration of visit. The "downloads" tab may identify inbound downloadable content received by the one or more client devices 130 and/or mobile devices 160, 170 over the local network 105. For instance, the "downloads" tab may include the time of download, the download source, or the particular client device that downloaded the content. Other information shown may include IP addresses accessed, domain names accessed, or uploads, etc.

The button 218 may be a user-selectable interface button on the interface 200 that allows a user to transmit the internet traffic activity shown on the interface 200 to an external source. For example, the button 218 may be clicked on by the user to redirect the mobile device 210 to a distribution platform such as, for example, e-mail. In some implementations, the user may click on the button 218 to forward the internet traffic activity to a third-party (e.g., a security provider, an antivirus service, alarm system service, etc.). In some implementations, the user may also click on the button 218 to forward the internet traffic activity to another mobile device such as, for example, the one or more mobile devices 160, 170.

Figure 3A:
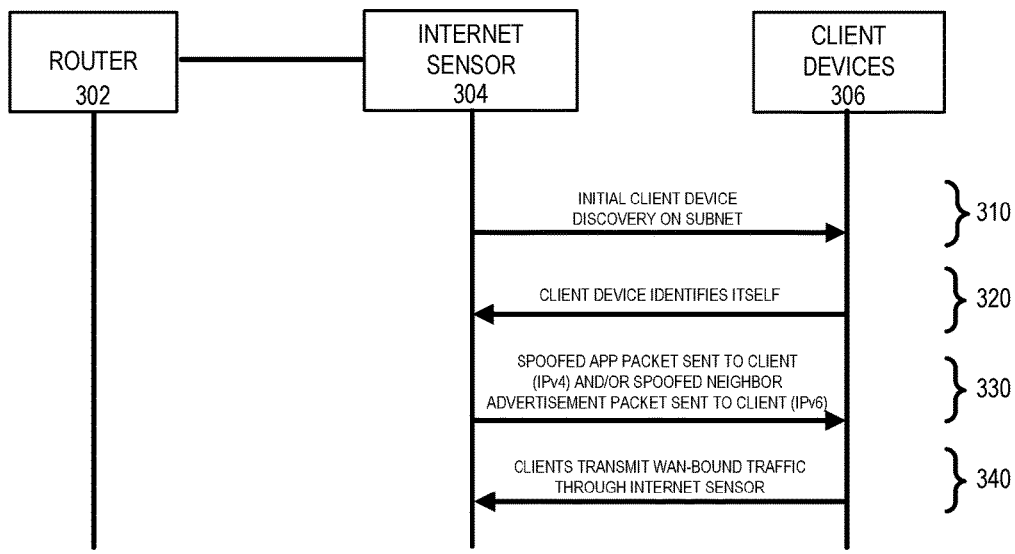
FIGS. 3A-3B are interaction diagrams for examples of processes for spoofing.
Figure 3B:
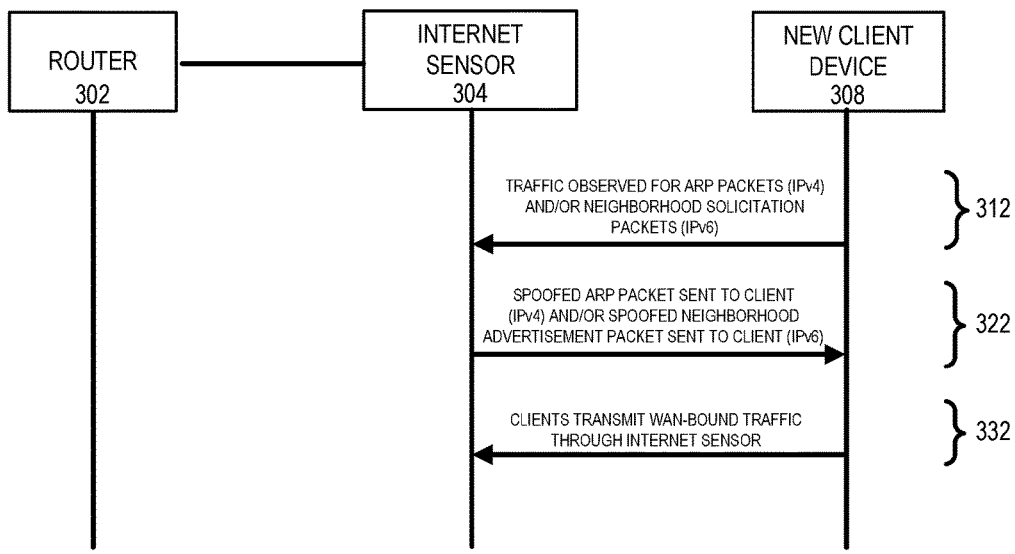

FIGS. 3A-3B are interaction diagrams for example processes 300A and 300B for default gateway MAC address spoofing. Briefly, the example processes 300A-300B include a router 302, an internet sensor 304, client devices 306, and a new client device 308.

FIG. 300A represents an example process used to discover client devices if not manually defined by the user via an interface on the cloud server 180. For example, in an IPv4 environment, various methods may be used to discover clients on the local network 105. In one instance, Address Resolution Protocol (ARP) requests may be made from the internet sensor 304 for each IPv4 address within the subnet (e.g. who has 192.168.1.2, who has 192.168.1.3, etc.) to populate a list of MAC/IPv4 addresses. In the other instance, the internet sensor 304 may observe ARP packets so that the internet sensor 304 may gradually build or update a list of MAC/IPv4 addresses for the internet sensor 304 to service. Once this initial process is complete, the internet sensor 304 may periodically transmit unsolicited ARP information to the discovered client devices stating that the existing local network 105 default gateway IPv4 address actually corresponds with the MAC address of the internet sensor 304. This helps to ensure that any updates that the default gateway sends out may be re-overwritten with the internet sensor 304 MAC address information.

In another example, in an IPv6 environment, additional or alternative methods may be used to discover clients on the local network 105. In one instance, the subnet may be scanned for active IPv6 clients on the network to populate list of MAC/IPv6 addresses. In the other instance, the internet sensor 304 may observe Neighbor Solicitation (NS) packets so that the internet sensor 304 may gradually build or update a list of MAC/IPv6 addresses for the internet sensor 304 to service. Once this initial process is complete, the internet sensor 304 may periodically send unsolicited Neighbor Advertisements (NA) on the network stating that the existing local network 105 default gateway IPv6 address actually corresponds with the MAC address of the internet sensor 304. This helps to ensure that any updates that the default gateway sends out may be re-overwritten with the internet sensor 304 MAC address information.

The example process 300A may include the internet sensor 304 discovering client devices on the subnet (310) should they not be manually defined via the cloud server 180. For example, in an IPv4 network environment, the internet sensor 304 may transmit an ARP request for who-has packets to find the assigned IPv4 addresses on the subnet. In another example, in an IPv6 network environment, the internet sensor 304 may send standard and/or modified ICMPv6 ping packets to the multicast address of ff02::1 on the local network 105 in an effort to solicit a response from all of the client devices 130 and/or mobile devices 160, 170 connected to the local network 105.

The example process 300A may include the internet sensor 304 obtaining the MAC/IP addresses of the client devices 306 (320). For example, the internet sensor 304 may transmit an ARP request who-has packet on the subnet requesting information for all IP addresses in the subnet. For instance, the ARP packet may include requests for the MAC addresses corresponding to the IP addresses of the client devices 306, and in response, each of the client devices 306 may provide their MAC addresses mapped to their IPv4 addresses. The internet sensor 304 may then build a list of the client devices 306 connected to the subnet.

The example process 300A and 300B may include the internet sensor 304 transmitting spoofed packets to the client devices 306 (330). For example, the internet sensor 304 may transmit spoofed ARP packets (IPv4) and/or Neighbor Advertisement packets (IPv6) to the client devices 306 stating that the default gateway IP address on local network 105 corresponds with the MAC address of the internet sensor 304 as opposed to the MAC address of the existing router 302 on local network 105.

The example process 300A may include the internet sensor 304 receiving WAN-bound traffic (340). For instance, after the internet sensor 304 may transmit the spoofed packets to the client devices 306, all traffic from the client devices 306 destined for outside the subnet (e.g., the Internet) may be initially transmitted through the internet sensor 304 and subsequently forwarded to the router 302 from the internet sensor 304.

FIG. 300B represents an example process for default gateway MAC address spoofing for a new client device added to the subnetwork. In some instances, the default gateway MAC address for a new client device may be spoofed after the initial discovery. In other instances, the initial packets transmitted by a new client when joining the local network 105 may be used as a method for initial discovery.

The example process 300B may include the internet sensor 304 observing traffic from a new client device 308 for ARP packets and/or Neighbor Solicitation packets (312). For example, the new client device 308 may request the MAC address of the router 302, and the internet sensor 304 may detect the MAC address request, and the internet sensor 304 may transmit a spoofed ARP packet (IPv4) and/or Neighbor Advertisement (IPv6) identifying itself as the router.

The example process 300B may include the internet sensor 304 transmitting spoofed packets to the client devices 306 (322). For example, the internet sensor 304 may transmit spoofed ARP packets (IPv4) and/or Neighbor Advertisement packets (IPv6) to the client devices 306 stating that the default gateway IP address corresponds with the MAC address of the internet sensor 304 as opposed to the MAC address of the router 302.

The example process 300B may include the internet sensor 304 receiving WAN-bound traffic (332). For instance, after the internet sensor 304 may transmit the spoofed packets to the new client device 308, all traffic from the new client device 308 destined for outside the subnet (e.g., the Internet) may be initially transmitted through the internet sensor 304 and subsequently forwarded to the router 302 from the internet sensor 304.

Figure 4:
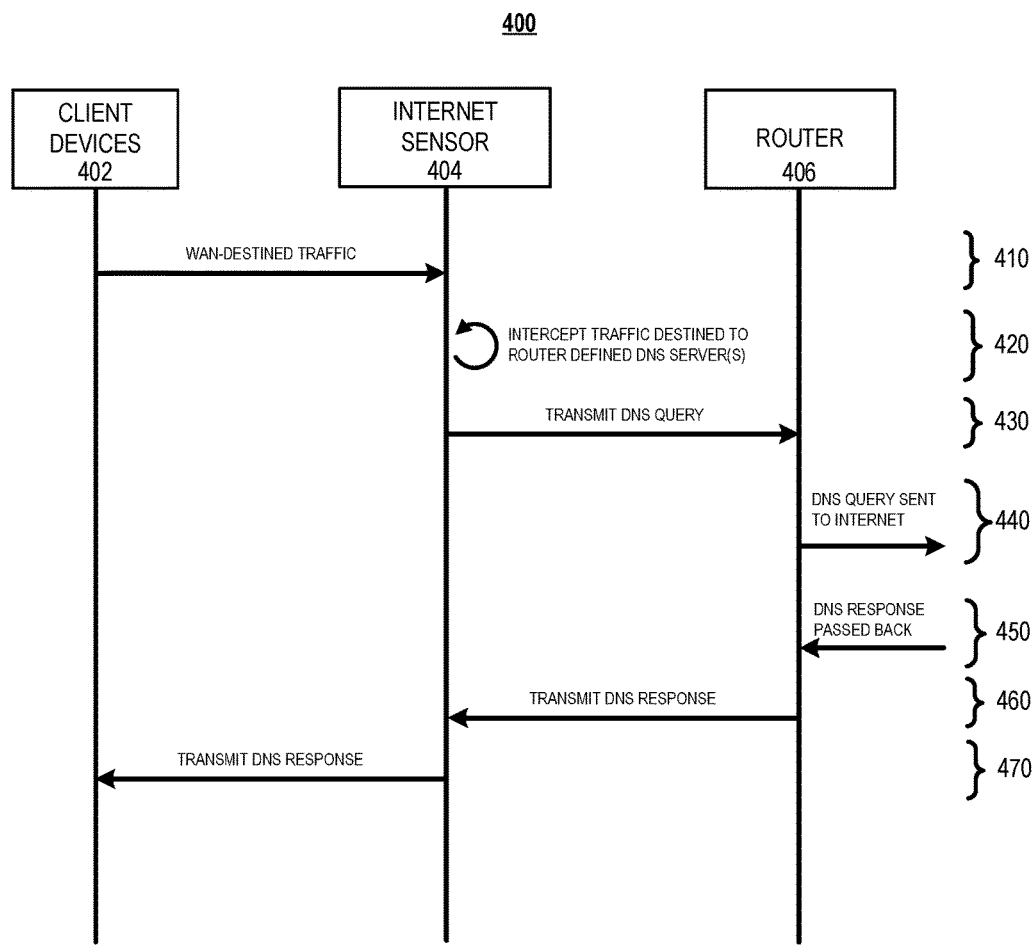
FIG. 4 is an interaction diagram for an example of a process for intercepting traffic.

FIG. 4 is an interaction diagram for an example process 400 for intercepting traffic from the client devices 402 by the internet sensor 404. For example, the client devices 402 may transmit WAN-destined traffic to the internet sensor 404, the internet sensor 404 may determine that the traffic is destined to a router-defined DNS server(s), the internet sensor 404 may transmit the DNS query to the router 406, the router 406 may transmit the DNS query to the Internet, the router 406 may receive a DNS response passed back from the Internet, the router 406 may transmit the DNS response to the internet sensor 404, and the internet sensor 404 may transmit the DNS response to the client devices 402.

In more detail, the example process 400 may include the client devices 402 transmitting WAN-destined traffic through the internet sensor 404 (410). For example, the internet sensor 404 may route traffic destined to the WAN when client devices 402 need to send traffic outside of their subnet within local network 105. The internet sensor 404 may forward the traffic destined for outside the subnet to the router 406 to pass to the internet.

In some implementations, the internet sensor 404 may intercept the default DNS protocol or ports, for example, UDP/TCP port 53, to perform the DNS query for traffic destined to a router-defined DNS server(s). In such instances, the intercepted traffic may enable the internet sensor to resolve the names of FQDNs requested by the client device 402 and then pass the resolution information back to the client device 402. The client device 402 LAN IP address and MAC address could then be logged with the associated FQDN request.

The example process 400 may include the internet sensor 404 determining that the traffic is destined to a router-defined DNS server(s) (420). For example, the internet sensor 404 may initially determine if outbound traffic, for instance, a DNS request, by the client devices 402 is destined for a DNS server defined on the router 406 on the subnet of the local network 105. In some instances, the internet sensor 404 may intercept the outbound traffic from the client devices 402 and act as a DNS proxy if the outbound traffic is destined to a router-defined DNS server. In other instances, if the internet sensor 404 determines that the outbound traffic from the client devices 402 is destined to a DNS server(s) not defined on the router 406, the internet sensor 404 may forward the outbound traffic to the destined DNS server(s) on the Internet.

The example process 400 may include the internet sensor 404 transmitting the DNS query to the router 406 (430). For example, the internet sensor 404 may transmit the outbound DNS request from the client devices 402 to the destined DNS server(s) defined on the router 406. In some implementations, the internet sensor 404 may use the received DNS requests to periodically analyze DNS resolution activity of the client devices 402 to show the fully qualified domain name (FQDN) of the destination servers on the Internet requested by each client device 402.

The example process 400 may include the router 406 transmitting the DNS query to the Internet (440). For example, the router 406 may transmit the DNS request received from the internet sensor 404 to the Internet.

The example process 400 may include the router 406 receiving a DNS response passed back from the Internet (450). For example, the DNS server(s) defined on the router 406 may send back a DNS response to the DNS query from the internet sensor 404.

The example process 400 may include the router 406 transmitting the DNS response to the internet sensor 404 (460). For example, the DNS server(s) defined on the router 406 may transmit the received DNS response from the Internet to the internet sensor 404 through the router 406.

The example process 400 may include the internet sensor 404 transmitting the DNS response to the client devices 402 (470). For example, the internet sensor 404 may transmit the DNS response passed back from the DNS server(s) defined on the router 406 to the client devices 402.

Figure 5:
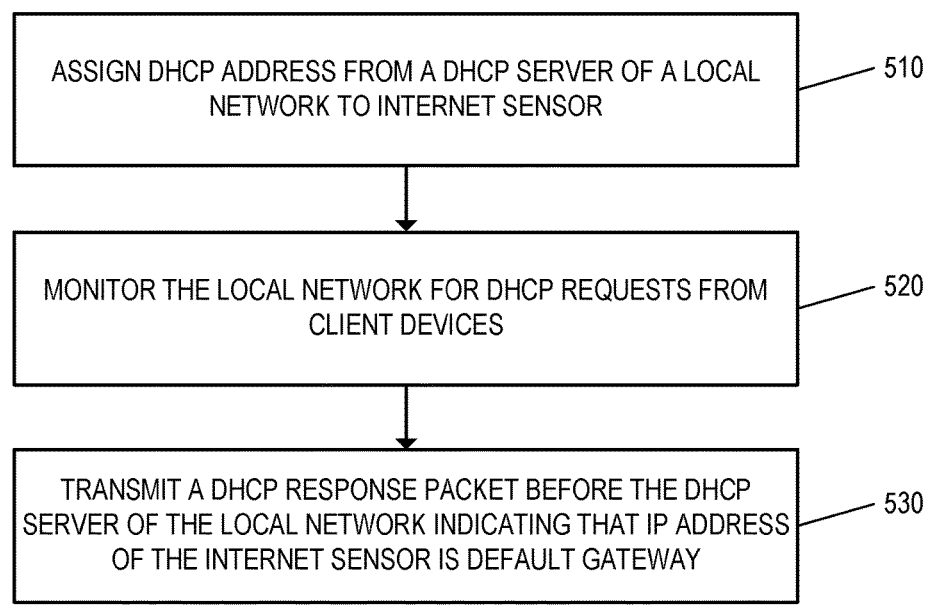
FIG. 5 illustrates an example of a process for DHCP server packet spoofing.

FIG. 5 illustrates an example process 500 for DHCP packet spoofing. Although the operation of example process 500 are described generally as being performed by the internet sensor 120, the operations of the example process 500 may be performed by any combination of the components of the system 100. In some implementations, operations of the example process 500 may be performed by one or more processors included in one or more electronic devices.

For example, the process 500 may include assigning a DHCP address from the DHCP server to the internet sensor (510). For example, in some instances, the DHCP server may run on the router of the local network 105 and may assign the internet sensor 120 a DHCP address after the internet sensor connects to a particular subnet within the local network 105. For instance, the router of the local network 105 may initially exchange communications with the internet sensor 120 using a DHCP transaction to obtain an IP address configuration, or other related network configuration parameters such as a designated DNS server(s).

The example process 500 may include monitoring the local network for DHCP requests transmitted by client devices (520). For example, the internet sensor 120 may initially monitor local network traffic over the local network 105 for DHCP discover or request messages transmitted by the client devices 130 and/or mobiles devices 160, 170 over the local network 105. The internet sensor 120 may then respond to the DHCP requests of the client devices 130 and/or mobile devices 160, 170 and substitute the default gateway IP address field within the DHCP packet with the IP address of the internet sensor 120.

In some implementations, where a client device 130 and/or mobile device 160, 170 is assigned a static IP address, the internet sensor 120 may have a DHCP reservation on the router of the local network 105, or a static IP address that is not part of the DHCP pool of the DHCP server on the router of the local network 105. In such implementations, the internet sensor 120 will never see a DHCP request from a client device 130 and/or mobile device 160, 170 thus will not send a DHCP packet with the default gateway IP address of the internet sensor 120 to the client devices 130 and/or mobile devices 160, 170 that have static IP addresses.

The example process 500 may include the internet sensor 120 transmitting a DHCP response packet with a different default gateway IP address, before the DHCP server of the local network, indicating that the IP address of the internet sensor is the default gateway (530). For example, the internet sensor 120 may transmit a DHCP response packet with the IP address of the internet sensor 120 being the default gateway in response to the DHCP request transmitted by the client devices 130 and/or mobile devices 160, 170. In some implementations, the internet sensor 120 may beat the DHCP response of the existing DHCP server operating on the router on local network 105 in time to provide a response packet with the default gateway IP address of the internet sensor 120. In such implementations, the internet sensor 120 may respond to the DHCP request from the client devices 130 and/or mobile devices 160, 170 before the DHCP response is sent by the DHCP server on the router of the local network 105. In response to receiving the DHCP response with the default gateway IP address of the internet sensor 120 at the client devices 130 and/or mobile devices 160,170, all outbound traffic destined for outside the subnet (e.g., the Internet) from the client devices 130 and/or mobile devices 160, 170 will be transmitted to the internet sensor 120 and then forwarded to the router of the local network 105.

Figure 6:
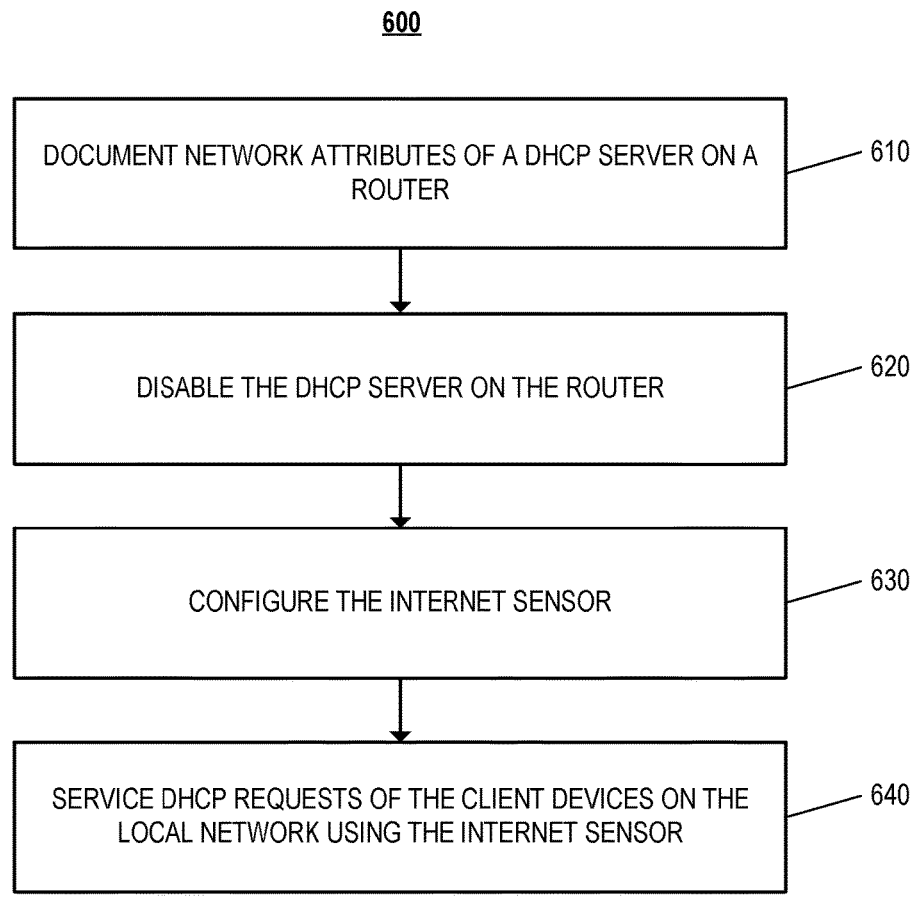
FIG. 6 illustrates an example of a process for standalone DHCP server.

FIG. 6 illustrates an example process 600 for a standalone DHCP server. For example, the example process 600 may include documenting network attributes of a router (610). For example, the system 100 may document the DHCP IP address pool, the subnet mask, available DNS servers, or the static local area network IP address (e.g., 192.168.0.1) of the router of the local network 105.

The example process 600 may include disabling a DHCP server on the router (620). For example, the system 100 may disable the DHCP server on the router of the local network 105. For instance, the DHCP server may be disabled programmatically by configuring the settings of the router on the local network 105.

In some implementations where the router of the local network 105 does not allow for disabling the DHCP server, the system 100 may configure the router of the local network 105 to have a DHCP pool with one IP address defined on the router of the local network 105. In such implementations, the IP address of the router may be associated with a non-existent MAC address or the MAC address of the internet sensor 120, via a DHCP reservation address on the router of the local network 105.

The example process 600 may include configuring an internet sensor (630). For example, the system 100 may initially configure the internet sensor 120 with a static IP address for use in the same network as the subnet of the default gateway. For instance, if the router of the local network 105 has an IP address of "192.168.0.1" on the subnet "255.255.255.0," the internet sensor 120 may have the IP address of "192.168.0.2" or "192.168.0.254" on the same subnet. In response, system 100 may also create an appropriate DHCP pool with subnet mask, DNS server(s), and a default gateway IP of the internet sensor 120. In some implementations, the MAC address of the internet sensor 120 may be used as the only DHCP reservation, which allows the internet sensor 120 to be automatically assigned an IP address by the DHCP server on the router of the local network 105.

The example process 600 may include servicing DHCP requests of client devices 130 and/or mobile devices 160, 170 on the local network 105 by the standalone DHCP server which may be running on the internet sensor (640). For example, the client devices 130 and/or mobile devices 160, 170 may initially transmit a DHCP request that may be received by the internet sensor 120, and in response, the internet sensor 120 may transmit a DHCP address lease to the client devices 130 and/or mobile devices 160, 170 with the IP address of the internet sensor 120 as the default gateway of the subnet of the local network 105. The internet sensor 120 may then direct the outbound traffic from the client devices 130 and/or mobile devices 160, 170 to the router of the local network 105 and in response, the router of the local network 105 may pass the traffic to the Internet. The router of the local network 105 may also receive return traffic from the Internet and direct the return traffic to the internet sensor 120, and in response, the internet sensor 120 may transmit the return traffic to the client devices 130 and/or mobile devices 160, 170.

Figure 7:
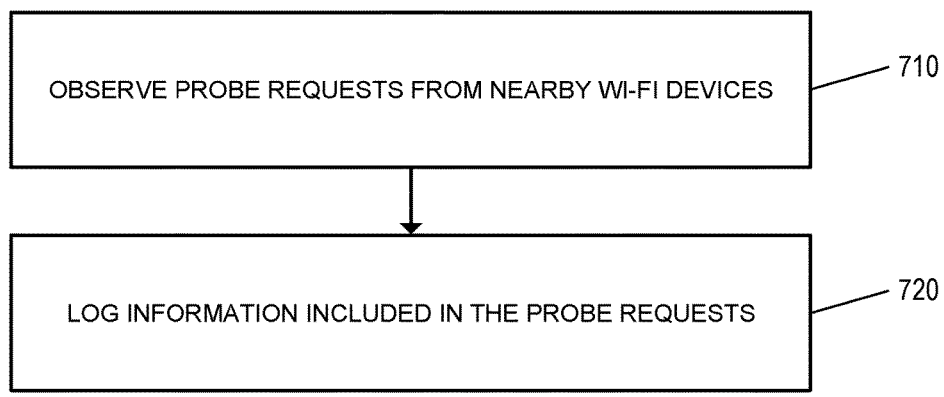
FIG. 7 illustrates an example of a process for detecting the presence of Wi-Fi devices that are nearby.

FIG. 7 illustrates an example process 700 for detecting the presence of Wi-Fi devices that are nearby. The process 700 may include monitoring Wi-Fi probe requests from nearby Wi-Fi devices (710). For example, the internet sensor 120 may be configured with a Wi-Fi interface that may monitor Wi-Fi management traffic from nearby Wi-Fi devices without being associated with a Wi-Fi access point or an ad hoc Wi-Fi network. The internet sensor 120 may detect probe requests transmitted by nearby Wi-Fi devices that send out the probe requests.

The process 700 may include logging information included in the probe requests (720). For example, the internet sensor 120 may log the date or timestamp, radio frequency (e.g., 2412 MHz), RSSI (e.g., −63 dB), BSSID, destination address, source address (e.g., MAC address of wireless device), SSID, or supported data rates (e.g., 1.0, 2.0, 5.5, 11.0, 6.0, 9.0, 12.0, or 18.0 Mbit).

Figure 8:
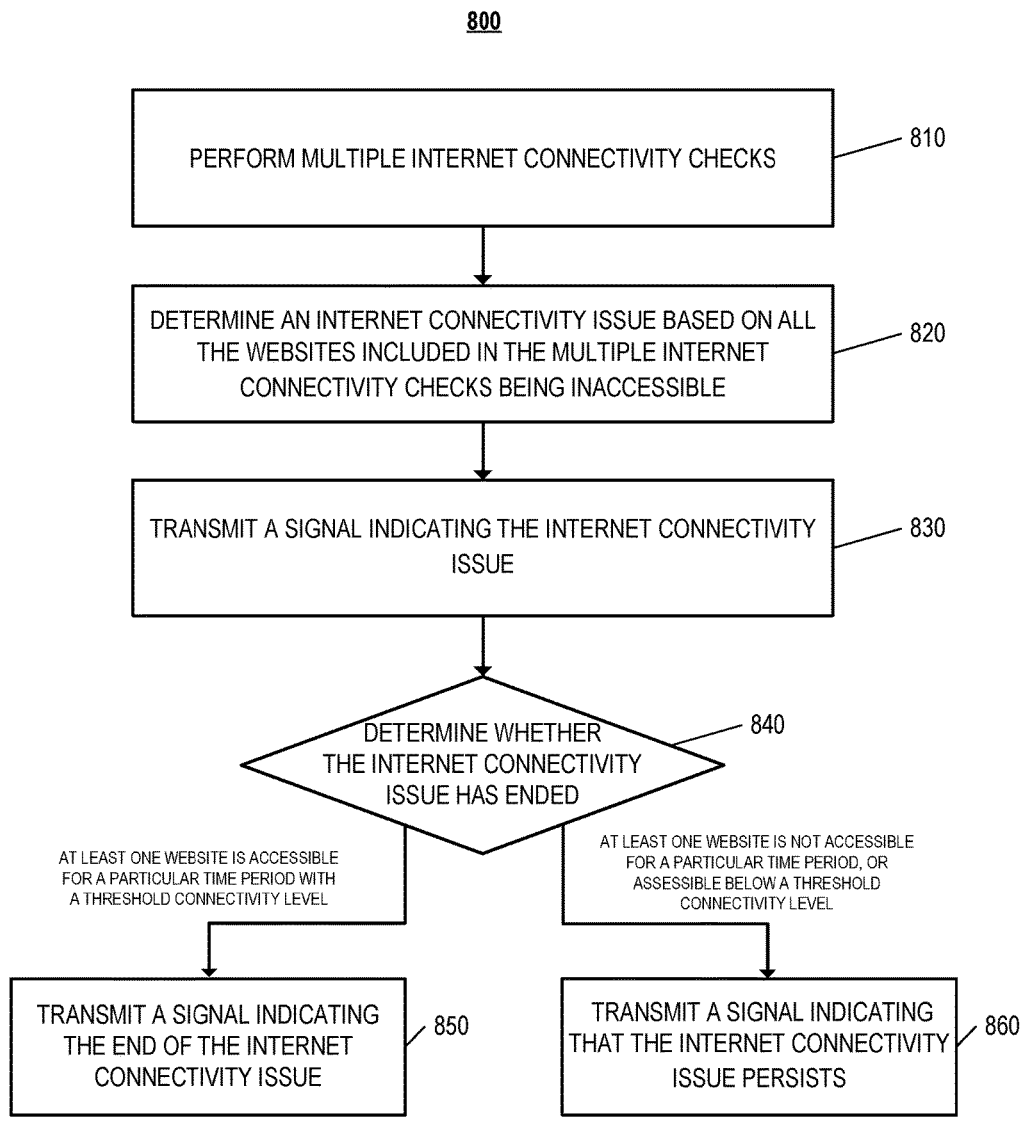
FIG. 8 illustrates an example of a process for validating internet connectivity.

FIG. 8 illustrates an example process 800 for validating internet connectivity. The process 800 may include performing multiple internet connectivity checks (810). For example, the internet sensor 120 may run a process that checks multiple websites via outbound ports on the Internet, for example, HTTP (TCP/80) or HTTPS (TCP/443), to initially determine if there is Internet connectivity to the internet 107 from the local network 105.

The process 800 may include determining an internet connectivity issue based on all the websites included in the multiple internet connectivity checks being inaccessible (820). For example, in response to determining that all of the websites on the internet 107 are inaccessible, the internet sensor 120 may determine that there is an internet connectivity issue from the local network 105.

The process 800 may include transmitting a signal indicating the internet connectivity issue (830). For example, in some instances, the internet sensor 120 may initially transmit a signal indicating the Internet connectivity issue to the monitor control unit 110 using wireless technologies such as, for example, radio frequency (RF), Bluetooth, or Wi-Fi. In response, the monitor control unit 110 may transmit information related to the Internet connectivity issue to a central monitoring station 190 and/or the cloud server 180 using a connection other than the local network 105 such as, for example, cellular or POTS.

The process 800 may include determining whether the internet connectivity issue has ended (840). For example, the internet sensor 120 may periodically perform Internet connectivity checks to determine if at least one website is accessible and check the continuity and quality of the accessibility over a particular time period (e.g., five minutes) and a threshold connectivity level (e.g., 100% connection attempts). In the first instance, the internet sensor 120 may determine an end of the internet connectivity issue based on at least one website being accessible for a particular time period with a threshold connectivity level. In such an instance, if the websites are continuously accessible over the particular time period with a connectivity level above the threshold level, the internet sensor 120 may then determine the internet connectivity issue has ended. In the second instance, the internet sensor 120 may determine that the internet connectivity issue persists based on at least one website not being accessible for a particular period of time, or if the website is accessible below a threshold connectivity level.

The process 800 may include transmitting a signal indicating the end of the internet connectivity issue (850). For example, the internet sensor 120 may transmit a signal to the monitor control unit 110 indicating the end of the Internet connectivity issue, and in response, the monitor control unit 110 may transmit information related to the Internet connectivity issue to the central monitoring station 190 and/or the cloud server 180 via the Internet 107, cellular or POTS.

The process 800 may include transmitting a signal indicating that the internet connectivity issue persists (860). For example, the internet sensor 120 may transmit a signal to the monitor control unit 110 indicating that the Internet connectivity issue persists, and in response, the monitor control unit 110 may transmit information related to the Internet connectivity issue to the central monitoring station 190 and/or the cloud server 180 via the Internet 107, cellular or POTS.

Figure 9:
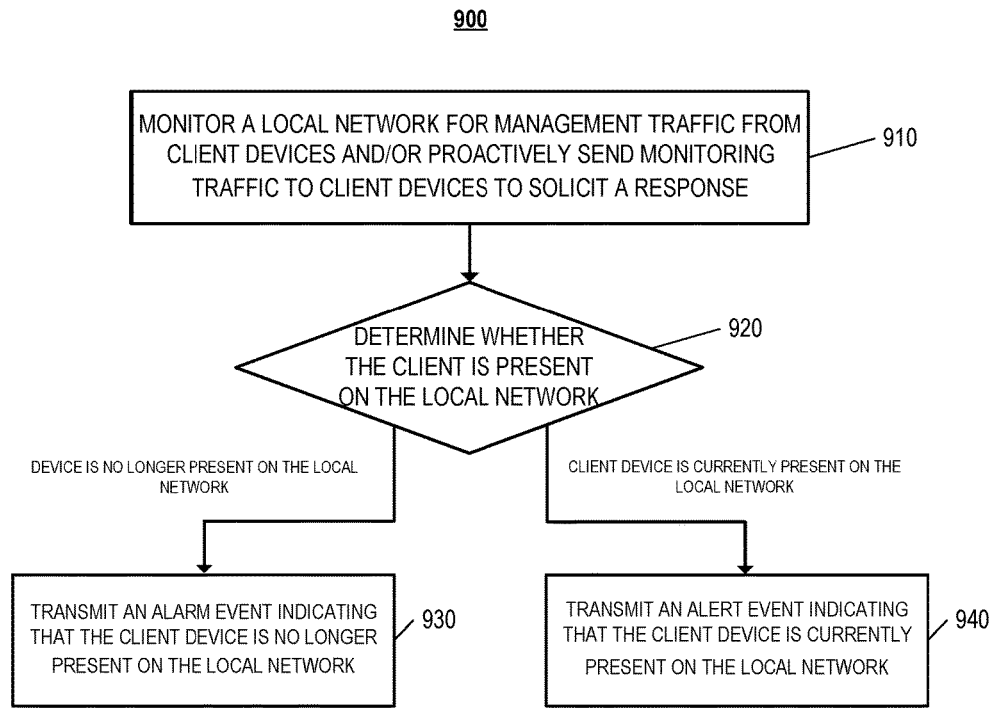
FIG. 9 illustrates an example of a process for confirming presence of client devices on a local network.

FIG. 9 illustrates an example process 900 for determining the presence of client devices 130 and/or mobile devices 160, 170 on the local network 105. The process 900 may include monitoring a local network for management traffic from client devices and/or proactively sending monitoring traffic to client devices to solicit a response (910). For example, the internet sensor 120 may monitor network management traffic such as, for example, ARP, ICMPv6 etc., and/or proactively send packets such as, for example, ICMP ping, ARP, etc. In some instances, the internet sensor 120 may run a process that monitors local network 105 traffic for IPCMv6 multicast management traffic from client devices 130 and/or mobile devices 160, 170. In other instances, the internet sensor 120 may run a process that sends an ARP request to solicit a response from client devices 130 and/or mobile devices 160, 170.

The process 900 may include determining whether the client device is no longer present on the local network (920). For example, in the first instance, the internet sensor 120 may determine that the client devices 130 and/or mobile devices 160, 170 are no longer present on the local network 105. In such an instance, in response to not seeing network management traffic such as, for example, ARP, ICMPv6, etc., of the client devices 130 and/or mobile devices 160, 170, or not receiving a response to ICMP Ping, ARP, etc. packets sent from the internet sensor 120, the internet sensor 120 may determine that a client device 130 and/or mobile device 160, 170 is no longer present on the local network 105.

In the second instance, the internet sensor 120 continues to monitor the local network 105 for periodic network management packets relating to, for example, ARP, ICMPv6, etc. and/or continue to monitor for responses to proactive monitoring from the internet sensor 120 to the client devices 130 and/or mobile devices 160, 170 through the use of methods such as, for example, ICMP ping, ARP, etc. In such an instance, the internet sensor 120 may check the continuity and quality of the accessibility over a particular time period (e.g., five minutes) and a threshold connectivity level (e.g., 100% connection attempts). For instance, if the client device 130 and/or mobile device 160, 170 is continuously observed as being present on local network 105 over the particular time period with a connectivity level above the threshold level, the internet sensor 120 may then determine the client device 130 and/or mobile device 160, 170 is confirmed to be back on the local network 105.

The process 900 may include transmitting an alarm event indicating that the client device is no longer present on the local network if the client device is no longer present on the local network (930). For example, in some instances, the internet sensor 120 may transmit an alarm event to the cloud server 180 indicating the absence of the client device 130 and/or mobile device 160, 170 from the local network 105.

The process 900 may include transmitting an alert event indicating that the client device is no longer absent from the local network if the client device is currently present on the local network following a previous alarm event for the client device (940). For example, the internet sensor 120 may transmit an alert event to the cloud server 180 indicating the client device 130 and/or mobile device 160, 170 is now present on the local network 105 and that the previous alarm event condition for the client device 130 and/or mobile device 160, 170 should be cleared.

Figure 10:
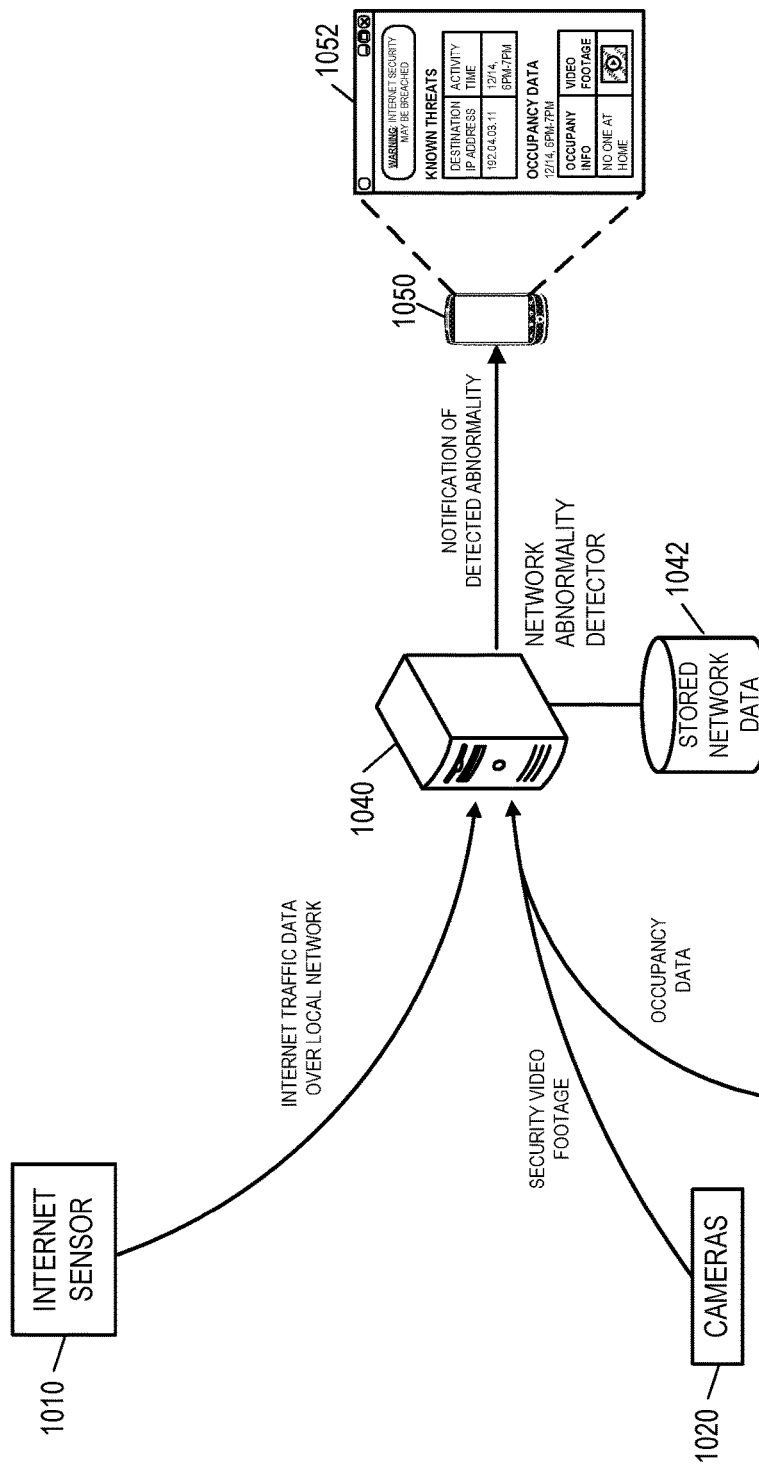
FIG. 10 is a diagram that illustrates examples of data that can be used to detect an abnormality over a local network.

FIG. 10 is a diagram that illustrates examples of data that can be used to detect an abnormality over a local network. Briefly, a network abnormality detector 1040 may obtain Internet activity data for the local network from an internet sensor 1010. In some implementations, the network abnormality detector may be one or more of a cloud server, a central monitoring station, or a monitor control unit, as described above with respect to FIG. 1. The network abnormality detector 1040 may also receive occupancy data (e.g., security video footage of the premises of the property from cameras 1020 and sensors 1030 that are located within the property associated with the local network. The network abnormality detector 1040 may then identify an abnormality associated with the local network based on the obtained Internet activity data, the obtained occupancy data, and stored network data 1042. In response, the network abnormality detector 1040 may then transmit an indication of the identified abnormality to a client device 1050 that is associated with a property owner. The indication may be provided on an interface 1052 that provides various types of information related to network activity over the local network and physical presence data at the property.

In more detail, the internet sensor 1010 may initially obtain Internet activity data. The internet sensor 1010 may monitor Internet activity of the local network using various spoofing techniques described above. For example, as described above, the internet sensor 1010 may use DHCP server packet spoofing to monitor incoming and outgoing connections over the local network. In other implementations, the network abnormality detector 1040 may be used as a standalone DHCP server to monitor incoming and outgoing connections over the local network. In other implementations, the internet sensor 1010 may be also be used as an activity sensor. The internet sensor 1010 may also obtain Internet activity data over a particular time period (e.g., one hour), and then analyze the obtained Internet activity data to identify a potential abnormality that occurs within the particular time period. The obtained Internet activity data is then transmitted to the network abnormality detector 1040.

The network abnormality detector 1040 may also obtain occupancy data indicating the physical presence of people within the property where the local network is located. For example, the network abnormality detector 1040 may obtain security video footage of the premises of the property from the cameras 1020. The cameras 1020 may be configured to monitor a location within the property where devices expected to be connected to the local network may be located (e.g., a desktop computer located within an office room). In another example, the network abnormality detector 1040 may obtain occupancy data from the sensors 1030 indicating the presence of individuals within certain locations of the property. The sensors 1030 may be placed in locations that are associated with the devices that connected over the local network such that Internet activity data for the particular time period may be cross-referenced with data indicating presence of individuals within the property over the particular time period.

The network abnormality detector 1040 then identifies an abnormality associated with the local network based on the obtained internet traffic data and the obtained occupancy data. For example, the network abnormality detector 1040 may cross-reference the obtained internet traffic data and the obtained occupancy data to verify that incoming and outgoing connections over the local network are attributable to the actions of individuals that are authorized to use the local network. The network abnormality detector 1040 may identify an abnormality associated with the local network if a comparison of the Internet activity data and the occupancy data for a particular time period indicates that an incoming or outgoing connection during the particular time period was not performed by a device that is authorized to use the local network.

The network abnormality detector 1040 may also identify an abnormality associated with the local network based on an identification of aberrant Internet activity over the local network. For example, if the network abnormality detector determines that the Internet activity data monitored by the internet sensor 1040 indicates an unusually high network activity for a device for a particular time period, but the occupancy data indicates that no one is physically present within the property during the particular time period, then the Internet abnormality detector 1040 may identify an abnormality associated with the local network. In this example, the network abnormality detector 1040 may determine that the Internet activity data associated with the client device may be the result of malware that is installed on the device.

In another example, the network abnormality detector 1040 may determine that the obtained Internet activity data for a device includes access to explicit or otherwise other restricted content during the particular time period. The Internet abnormality detector 1040 may then identify an individual that used the device during the particular time period based on obtained occupancy data (e.g., a video footage with the device within the field of view during the particular time period). In this example, if the identified user is associated with a user account that is restricted from accessing the content indicated by the obtained Internet activity data, then the Internet abnormality detector 1040 may identify an abnormality associated with the local network.

In some implementations, the network abnormality detector 1040 may initially analyze the stored network data 1042 to identify a list of devices that were previously authorized to connect over the local network. The network abnormality detector 1040 may then determine if the Internet activity data obtained for a particular time period specifies a device identifier (e.g., MAC address) for a device that is not included within the list of authorized devices. The network abnormality detector 1040 may then perform a set of verification operations to determine if the activity associated with such devices are the result of undesired activity. For example, the occupancy data may be used to verify that an authorized individual that is physically present within the property has used a device that is indicated by the Internet activity data during the particular time period. In other implementations, the stored network data 1042 may indicate a list of devices that are physically present within the property, and used by the network abnormality detector 1040 to identify devices indicated by the Internet activity data but are not physically present within the property (e.g., associated with a remote destination IP address and/or a FQDN). In such instances, the network abnormality detector 1040 may determine an abnormality if a particular device determined to be physically present within the property is not identified within a list of authorized devices is included in the Internet activity data.

In response to identifying an abnormality associated with the local network, the network abnormality detector 1040 then transmits an indication of the identified abnormality to the client device 1050. The indication may be presented on a user interface 1052 that includes information related to the obtained Internet activity data (e.g., destination IP address and/or a FQDN of a potential known threat, and a time point associated with an incoming or outgoing connection over the local network). The interface 1052 may also include information related to the obtained occupancy data (e.g., occupancy data indicating that the property is not occupied, security footage captured by the camera 1020). In the example depicted, a remote destination IP address and/or a FQDN is indicated by the obtained Internet activity data, while the occupancy data indicates that no one has been present in the property during the time period in which the Internet activity took place. In response, the network abnormality detector 1040 identifies this instance as an abnormality indicating that a fraudulent connection may have been made by an unauthorized party over the local network.

In some implementations, the abnormality detection techniques described above may additionally or alternatively be performed on the internet sensor 1010, or a combination of the internet sensor 1010 and the network abnormality detector 1040. For instance, as described previously with respect to FIGS. 3A-3B, and 4-7, the internet sensor 1010 may use various techniques to monitor Internet activity data over the local network, and identify an abnormality based on the monitored Internet activity. Alternatively, in other implementations, the internet sensor 1010 may preliminarily identify an abnormality associated with the local network, which is then further analyzed and confirmed by the network abnormality detector 1040.

In some implementations, the network abnormality detector 1040 may be configured to identify abnormalities for the local network within the property without actually being connected to the local network. For example, as described above with respect to FIG. 7, the network abnormality detector 1040 may observe probe requests from nearby wireless devices that broadcast requests to establish a connection over a wireless medium (e.g., Wi-Fi network, Bluetooth, near-field communication, etc.). In this example, the network abnormality detector 1040 may be configured to identify connection requests broadcasted by nearby wireless devices as a means of identifying unauthorized devices within a proximity to the property. For example, if an individual at a neighboring property attempts to connect to the local network, the network abnormality detector 1040 may detect the broadcasted connection request and identify the request as an attempt by an unauthorized device to connect to the local network. In such an instance, the network abnormality detector 1040 may compare information included within the connection request to information stored within the stored network data 1042.

Figure 11:
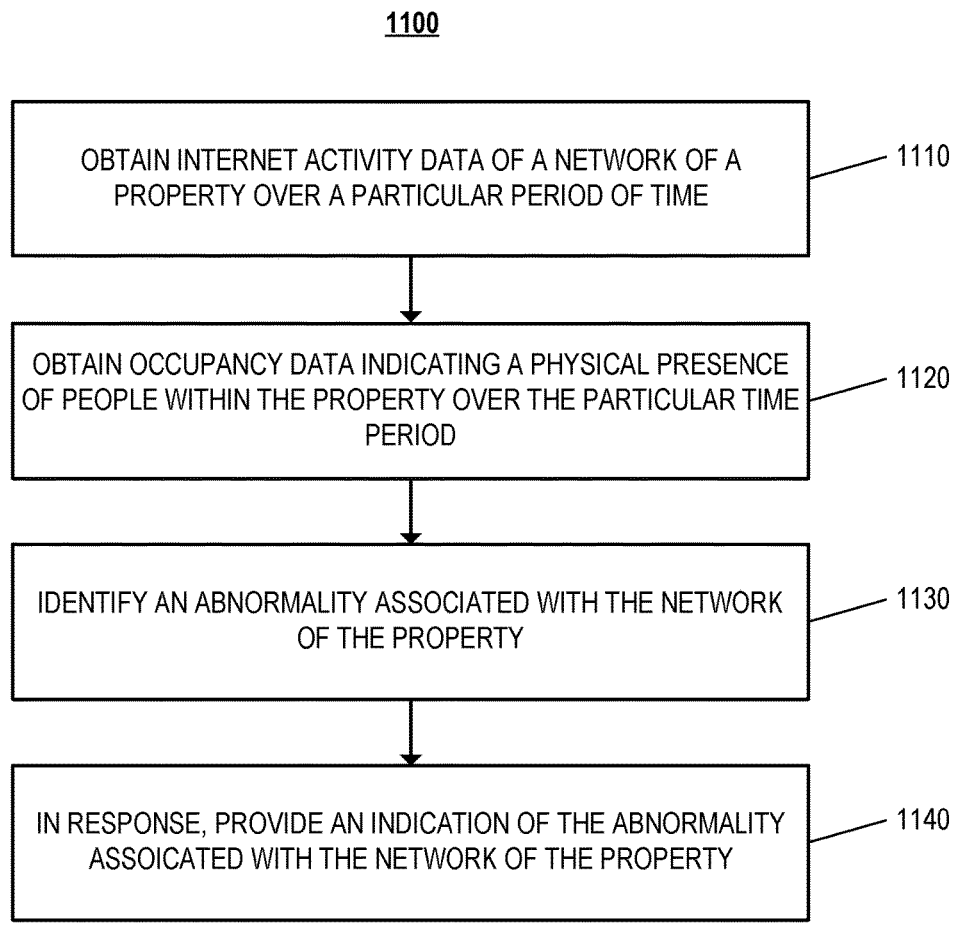
FIG. 11 illustrates an example of a process for detecting an abnormality over a local network.

FIG. 11 illustrates an example of a process 1100 for detecting an abnormality over a local network. Briefly, the process 1100 may include obtaining Internet activity data of a network of a property over a particular period of time (1110), obtaining occupancy data indicating a physical presence of people within the property over the particular period of time (1120), identifying an abnormality associated with the network of the property (1130), and in response, providing an indication of the abnormality associated with the network of the property (1140).

In more detail, the process 1100 may include obtaining Internet activity data of a network of a property over a particular period of time (1110). For instance, the network abnormality detector 1040 may obtain Internet activity data over the local network from the internet sensor 1010. As described above, the network abnormality detector 1040 may initially be configured to monitor and/or intercept Internet activity by client devices connected over the local network. In one example, the internet sensor 1010 may intercept traffic by spoofing the MAC or IP address of the default gateway of the subnet. In another example, the internet sensor 1010 may intercept traffic through DHCP packet spoofing by substituting the IP address of the default gateway with the IP address of the internet sensor. In yet another example, the internet sensor 1010 may observe WAN traffic by operating as a standalone DHCP server. In still another example, the internet sensor 1010 may intercept traffic by operating as a Wi-Fi access point with switch ports by having the user disable the service set identifier (SSID) of the router/access point and associate the client devices on the subnet with the SSID of the internet sensor.

The process 1100 may include obtaining occupancy data indicating a physical presence of people within the property over the particular period of time (1120). For instance, the network abnormality detector 1040 may obtain data from one or more devices associated with the property where the local network is located. The obtained data may indicate a physical presence of people within the property over a particular period of time. For example, the network abnormality detector 1040 may obtain security video footage of the premises of the property from the cameras 1020, and occupancy data from the sensors 1030.

The process 1100 may include identifying an abnormality associated with the network of the property (1130). For instance, the network abnormality detector 1040 may identify an abnormality based on the obtained Internet activity data and the obtained occupancy data. For instance, the network abnormality detector 1040 may identify a list of client devices that are connected to the local network over a particular period of time, and then correlate the Internet activity data of the client devices to the physical presence of people indicated by the occupancy data over the particular time period. For example, the network abnormality detector 1040 may verify that the activity over the local network for the particular time period was in fact performed by individuals that are physically present within the property during the particular time period. If the comparison indicates that the activity over the particular time period was not the result of individuals that are physically present within the property over the particular time period, then the network abnormality detector 1040 may identify an abnormality associated with the local network.

The process 1100 may include providing an indication of the abnormality associated with the network of the property in response to identifying an abnormality associated with the network of the property (1140). For instance, the network abnormality detector 1040 may transmit a communication to the client device 1050 indicating the abnormality of the local network. The communication may include a destination IP address and/or a FQDN associated with the incoming or outgoing connection that is related to the identified abnormality, a time point of the incoming connection, and/or related activity data indicating that the incoming or outgoing connection was not performed by an individual that was physically present within the property during the particular time period.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computers, the method comprising:
    obtaining network activity data on a device within a property over a particular time period,
    obtaining, occupancy data indicating a physical presence of people within the property over the particular time period;
    determining (i) that the network activity data for the device within the property indicates abnormal network traffic for the device and (ii) that the abnormal network traffic occurred over the particular time period for which the occupancy data indicated that the property was unoccupied; and
    in response to determining (i) that the network activity data for the device within the property indicates abnormal network traffic for the device and (ii) that the abnormal network traffic occurred over the particular time period for which the occupancy data indicated that the property was unoccupied, providing an indication to a user that network security within the property is likely to be breached.

2. The method of claim 1, wherein the occupancy data indicating the physical presence of people within the property over the particular time period comprises data indicating whether individuals that are identified to be associated with the device are physically present within the property.

3. The method of claim 1, wherein the network activity data on the device comprises:
    data indicating outgoing connection requests from the device to webpages;
    IP addresses associated with the devices connected over the network; and
    a bandwidth utilization of the network over the particular time period.

4. The method of claim 1, wherein determining (i) that the network activity data for the device within the property indicates abnormal network traffic for the device and (ii) that the abnormal network traffic occurred over the particular time period for which the occupancy data indicated that the property was unoccupied comprises:
    determining that obtained network activity data indicates an abnormally high activity for the device over the network of the property;
    determining, based on the obtained presence data, that the device has not been physically used within the property over the particular time period; and
    in response to determining that the device has not been physically used within the property over the particular period of time, determining that the abnormally high activity for the device is likely caused by computer malware.

5. The method of claim 1, wherein determining (i) that the network activity data for the device within the property indicates abnormal network traffic for the device and (ii) that the abnormal network traffic occurred over the particular time period for which the occupancy data indicated that the property was unoccupied comprises:
   determining that obtained network activity data indicates an abnormally high activity for the device over the network of the property;
   identifying a user that has previously been associated with the device within the property;
   determining, based on the obtained occupancy data, that the user has not been physically present within the property over the particular time period; and
   determining that the obtained network activity data indicates that the device was used by an unauthorized user during the particular time period.

6. The method of claim 1, wherein the indication comprises:
   a destination IP address associated with the device;
   one or more time stamps corresponding to one or more incoming connections from the destination IP address over the network of the property; and
   an indication that the device is infected with computer malware.

7. A system comprising:
   one or more computers; and
   one or more storage devices storing instructions that, when executed by the one or more computers, cause the one or more computers to perform operations comprising:
      obtaining network activity data on a device within a property over a particular time period,
      obtaining, occupancy data indicating a physical presence of people within the property over the particular time period;
      determining (i) that the network activity data for the device within the property indicates abnormal network traffic for the device and (ii) that the abnormal network traffic occurred over the particular time period for which the occupancy data indicated that the property was unoccupied; and
      in response to determining (i) that the network activity data for the device within the property indicates abnormal network traffic for the device and (ii) that the abnormal network traffic occurred over the particular time period for which the occupancy data indicated that the property was unoccupied, providing an indication to a user that network security within the property is likely to be breached.

8. The system of claim 7, wherein the occupancy data indicating the physical presence of people within the property over the particular time period comprises data indicating whether individuals that are identified to be associated with the device are physically present within the property.

9. The system of claim 7, wherein the network activity data on the device comprises:
   data indicating outgoing connection requests from the device to webpages;
   IP addresses associated with the devices connected over the network; and
   a bandwidth utilization of the network over the particular time period.

10. The system of claim 7, wherein determining (i) that the network activity data for the device within the property indicates abnormal network traffic for the device and (ii) that the abnormal network traffic occurred over the particular time period for which the occupancy data indicated that the property was unoccupied comprises:
    determining that obtained network activity data indicates an abnormally high activity for the device over the network of the property;
    determining, based on the obtained presence data, that the device has not been physically used within the property over the particular time period; and
    in response to determining that the device has not been physically used within the property over the particular period of time, determining that the abnormally high activity for the device is likely caused by computer malware.

11. A non-transitory computer-readable storage device encoded with computer program instructions that, when executed by one or more computers, cause the one or more computers to perform operations comprising:
    obtaining network activity data on a device within a property over a particular time period,
    obtaining, occupancy data indicating a physical presence of people within the property over the particular time period;
    determining (i) that the network activity data for the device within the property indicates abnormal network traffic for the device and (ii) that the abnormal network traffic occurred over the particular time period for which the occupancy data indicated that the property was unoccupied; and
    in response to determining (i) that the network activity data for the device within the property indicates abnormal network traffic for the device and (ii) that the abnormal network traffic occurred over the particular time period for which the occupancy data indicated that the property was unoccupied, providing an indication to a user that network security within the property is likely to be breached.

12. The non-transitory computer-readable storage device of claim 11, wherein the occupancy data indicating the physical presence of people within the property over the particular time period comprises data indicating whether individuals that are identified to be associated with the device are physically present within the property.

13. The non-transitory computer-readable storage device of claim 11, wherein the network activity data on the device comprises:
    data indicating outgoing connection requests from the device to webpages;
    IP addresses associated with the devices connected over the network; and
    a bandwidth utilization of the network over the particular time period.

14. The non-transitory computer-readable storage device of claim 11, wherein determining (i) that the network activity data for the device within the property indicates abnormal network traffic for the device and (ii) that the abnormal network traffic occurred over the particular time period for which the occupancy data indicated that the property was unoccupied comprises:
    determining that obtained network activity data indicates an abnormally high activity for the device over the network of the property;

determining, based on the obtained presence data, that the device has not been physically used within the property over the particular time period; and in response to determining that the device has not been physically used within the property over the particular period of time, determining that the abnormally high activity for the device is likely caused by computer malware.

15. The method of claim 1, wherein obtaining, from one or more devices associated with the property, occupancy data indicating a physical presence of people within the property over the particular time period comprises:

obtaining video taken by a camera within the property; and determining that the video indicates that a person was not physically present in the property during the particular time period.

16. The method of claim 15, wherein determining (i) that the network activity data for the device within the property indicates abnormal network traffic for the device and (ii) that the abnormal network traffic occurred over the particular time period for which the occupancy data indicated that the property was unoccupied comprises:

determining that the network activity data for the device within the property indicates an abnormal increase in network traffic for the device while video from a camera within the property indicates that no one is physically present at the property.

* * * * *